(12) United States Patent
Leap et al.

(10) Patent No.: US 10,841,340 B2
(45) Date of Patent: Nov. 17, 2020

(54) CUSTOM NODE AND PROFILE CLASSIFICATIONS FOR ENTERPRISE SECURITY MANAGEMENT TOOL

(71) Applicant: Unisys Corporation, Blue Bell, PA (US)

(72) Inventors: Michael C. Leap, Malvern, PA (US); Michael Di Domenico, Malvern, PA (US); Richard W. Phelps, Cary, NC (US); Philippe Jolly, Schipol Rijk (NL); Robert A. Johnson, Malvern, PA (US); Emily M. Shoup, Malvern, PA (US)

(73) Assignee: Unisys Corporation, Blue Bell, PA (US)

( * ) Notice: Subject to any disclaimer, the term of this patent is extended or adjusted under 35 U.S.C. 154(b) by 284 days.

(21) Appl. No.: 15/972,524

(22) Filed: May 7, 2018

(65) Prior Publication Data

US 2019/0342340 A1 Nov. 7, 2019

(51) Int. Cl.
*H04L 29/06* (2006.01)
*H04L 12/24* (2006.01)
*H04L 29/08* (2006.01)

(52) U.S. Cl.
CPC ......... *H04L 63/20* (2013.01); *H04L 41/0286* (2013.01); *H04L 41/0803* (2013.01); *H04L 41/0893* (2013.01); *H04L 41/12* (2013.01); *H04L 41/22* (2013.01); *H04L 41/26* (2013.01); *H04L 67/30* (2013.01)

(58) Field of Classification Search
CPC . H04L 63/20; H04L 41/0893; H04L 41/0803; H04L 41/12; H04L 41/22; H04L 41/26; H04L 67/306; H04L 67/30
USPC .......................................................... 726/1
See application file for complete search history.

(56) References Cited

U.S. PATENT DOCUMENTS

| 8,738,745 | B1 * | 5/2014 | Brandwine | ............. H04L 67/10 709/220 |
| 2002/0165961 | A1 * | 11/2002 | Everdell | ................. H04L 41/22 709/225 |
| 2003/0126195 | A1 * | 7/2003 | Reynolds | ............ G06F 11/2023 709/203 |
| 2004/0031030 | A1 * | 2/2004 | Kidder | ...................... G06F 1/14 717/172 |

(Continued)

OTHER PUBLICATIONS

NPL Search Results (Year: 2020).*

(Continued)

*Primary Examiner* — Syed A Zaidi

(57) ABSTRACT

Methods and systems for configuring a security policy for an enterprise within an enterprise security management tool are disclosed. In some aspects, such systems receive a definition of at least one custom classification within a user interface of the enterprise security management configuration tool, including a name of a profile and network activity associated with one or more nodes to be included within the profile. Such systems also generate a security settings file to be applied within the enterprise, the security settings file including, for each profile, a common security policy to each of the nodes included in the profile. The profiles to which the security settings file is applied include the profile defined by the at least one custom classification.

23 Claims, 28 Drawing Sheets

(56) References Cited

U.S. PATENT DOCUMENTS

| | | | |
|---|---|---|---|
| 2005/0198247 A1* | 9/2005 | Perry | H04L 7/0008 709/223 |
| 2006/0089934 A1* | 4/2006 | Jibbe | G06F 11/2247 |
| 2012/0054363 A1* | 3/2012 | Hart | H04L 12/66 709/232 |
| 2012/0158516 A1* | 6/2012 | Wooten, III | G06Q 30/0269 705/14.66 |
| 2013/0108259 A1* | 5/2013 | Srinivas | H04L 45/20 398/25 |
| 2014/0282586 A1* | 9/2014 | Shear | G06F 16/248 718/104 |
| 2015/0373529 A1* | 12/2015 | Scarr | G06Q 10/06 455/414.1 |
| 2016/0057020 A1* | 2/2016 | Halmstad | H04L 67/26 715/740 |
| 2017/0063920 A1* | 3/2017 | Thomas | H04L 63/1408 |
| 2019/0090305 A1* | 3/2019 | Hunter | H04L 12/66 |

OTHER PUBLICATIONS

Muñoz, Raul, et al. "Integrated SDN/NFV management and orchestration architecture for dynamic deployment of virtual SDN control instances for virtual tenant networks." Journal of Optical Communications and Networking 7.11 (2015): B62-B70. (Year: 2015).*

* cited by examiner

CUSTOM NODE AND PROFILE CLASSIFICATIONS FOR ENTERPRISE SECURITY MANAGEMENT TOOL

BACKGROUND

Robust enterprise security software is complex. It often requires installation of specific security software packages at each trusted computer associated with the enterprise, as well as management of various profiles for each of a number of different types of users having differing roles. Furthermore, each server within an enterprise network will typically have a collection of allowed connections external to the network to be managed.

The complexity of enterprise security software increases with the level of security required. For example, in enterprise networks in which data must be secured during intra-network storage and/or transmission, detailed definitions regarding a level of security for each user, types of encryption, permissions, and other policies must be set. Because there are often a large number of computing systems within such an enterprise network, provisioning each system can become so complex as to be time- and cost-prohibitive to install such enterprise security software, or at the very least to exploit its full capabilities. Although network security administrators may find some ways to simplify the deployment of a security solution, for example by creating a template image of security software that can then be customized for each server or endpoint to be provisioned, this still requires each endpoint to be custom provisioned by the network security administrator, which remains time-intensive.

Furthermore, for network security administrators in organizations that are first installing enterprise security software, it can be difficult, if not impossible, to know what specific policies should be created and how to create or deploy such policies within their existing network. Substantial training and weeks, if not months, of deployment/implementation operations are therefore required in many such situations.

Accordingly, it may be advantageous to provide a convenient visual tool that can assist in configuring a security policy for an organization having various types of computing resources (e.g., database servers, application servers, email servers, user nodes in various departments, etc.). Because an organization may have a very large number of such computing resources, managing each resource individually often becomes untenable; it is more realistic to define policies for types of nodes, rather than individual nodes. However, because each organization may have needs or network topologies that are different, predefined groupings of types of nodes may not group nodes into groups based on type in a manner desirable to the organization. Additionally, because there may be a number of types of communications that are consumed or produced by different node types, each of those types of communications would typically be required to be defined separately for a network. Accordingly, mechanisms that ensure flexibility in defining a network and accordingly generating a security policy that can be deployed across that network are desired.

SUMMARY

In a first aspect, a method of configuring a security policy for an enterprise network within an enterprise security management tool is disclosed. The method includes receiving network concordance data at an enterprise security management configuration tool, the network concordance data including a record of communications among a plurality of nodes within the enterprise. The method also includes receiving a definition of at least one custom classification within a user interface of the enterprise security management configuration tool, the at least one custom classification including a name of a profile and network activity associated with one or more nodes to be included within the profile. The method further includes receiving, in a configuration user interface, a selection of an affinitization level selected from a plurality of discrete affinitization levels, each of the discrete affinitization levels corresponding to a different extent to which nodes within an enterprise are grouped into profiles that include the profile defined by the at least one custom classification. The method also includes grouping each of the plurality of nodes identified in the network concordance data into a plurality of profiles based on the selected affinitization level, and generating a security settings file to be applied within the enterprise, the security settings file including, for each profile included in the plurality of profiles, a common security policy to each of the nodes included in the profile. The plurality of profiles includes the profile defined by the at least one custom classification.

In a second aspect, a computing system includes a programmable circuit and a memory communicatively connected to the programmable circuit. The memory stores computer-executable instructions implementing an enterprise security management configuration tool. When executed, the enterprise security management tool causes the computing system to: receive network concordance data including a record of communications among a plurality of nodes within the enterprise; receive a definition of at least one custom classification within a user interface of the enterprise security management configuration tool, the at least one custom classification including a name of a profile and network activity associated with one or more nodes to be included within the profile; receive, in a configuration user interface, a selection of an affinitization level selected from a plurality of discrete affinitization levels, each of the discrete affinitization levels corresponding to a different extent to which nodes within an enterprise are grouped into profiles that include the profile defined by the at least one custom classification; group each of the plurality of nodes identified in the network concordance data into a plurality of profiles based on the selected affinitization level; and generate a security settings file to be applied within the enterprise, the security settings file including, for each profile included in the plurality of profiles, a common security policy to each of the nodes included in the profile. The plurality of profiles includes the profile defined by the at least one custom classification.

In a third aspect, a secured enterprise network includes a plurality of nodes associated with an enterprise network, at least one security server associated with the enterprise network, and an enterprise management server configured to distribute security policy settings to each of the plurality of nodes, the security policy settings enforced by the at least one security server. The secured enterprise network further includes an enterprise management configuration server communicatively connected to the enterprise management server. The enterprise management configuration server executes an enterprise security management tool configured to: receive network concordance data including a record of communications among the plurality of nodes; receive a definition of at least one custom service including a name of the custom service, a port, and a protocol; receive a definition of at least one custom classification within a user interface, the at least one custom classification including a name of a profile and at least one service associated with one or more nodes to be included within the profile, the at least one service including the at least one custom service; receive, in a configuration user interface, a selection of an affinitization level selected from a plurality of discrete affinitization levels, each of the discrete affinitization levels corresponding to a different extent to which nodes within an enterprise are grouped into profiles that include the profile defined by the at least one custom classification; group each of the plurality of nodes identified in the network concordance data into a plurality of profiles based on the selected affinitization level; and provide a security policy file to the enterprise management server, the security policy file including, for each profile included in the plurality of profiles, a common security policy for each of the nodes included in the profile.

In a still further aspect, an enterprise security management server includes a programmable circuit and a memory communicatively connected to the programmable circuit. The memory stores computer-executable instructions implementing an enterprise security management tool which, when executed, causes the server to: receive, at a classification manager user interface of the enterprise security management tool, a definition of a custom classification, the definition including a name of the custom classification and network activity associated with the custom classification; and display an enterprise security configuration user interface displaying a logical network topology for an enterprise network based on concordance data imported by the enterprise security management tool, the logical network topology arranging a plurality of nodes within an enterprise network into a plurality of profiles, the plurality of profiles each being classified according to classifications managed by the classification manager and including a profile classified according to the custom classification, thereby reducing a number of nodes displayed in the enterprise security configuration user interface.

A variety of additional aspects will be set forth in the description that follows. The aspects can relate to individual features and to combinations of features. It is to be understood that both the foregoing general description and the following detailed description are exemplary and explanatory only and are not restrictive of the broad inventive concepts upon which the embodiments disclosed herein are based.

BRIEF DESCRIPTION OF THE DRAWINGS

The following drawings are illustrative of particular embodiments of the present disclosure and therefore do not limit the scope of the present disclosure. The drawings are not to scale and are intended for use in conjunction with the explanations in the following detailed description. Embodiments of the present disclosure will hereinafter be described in conjunction with the appended drawings, wherein like numerals denote like elements.

FIG. 19 is a service definition user interface provided by a service manager, according to an example embodiment;

FIG. 20 is a further service definition user interface provided by the service manager, according to an example embodiment;

DETAILED DESCRIPTION

Figure 1:
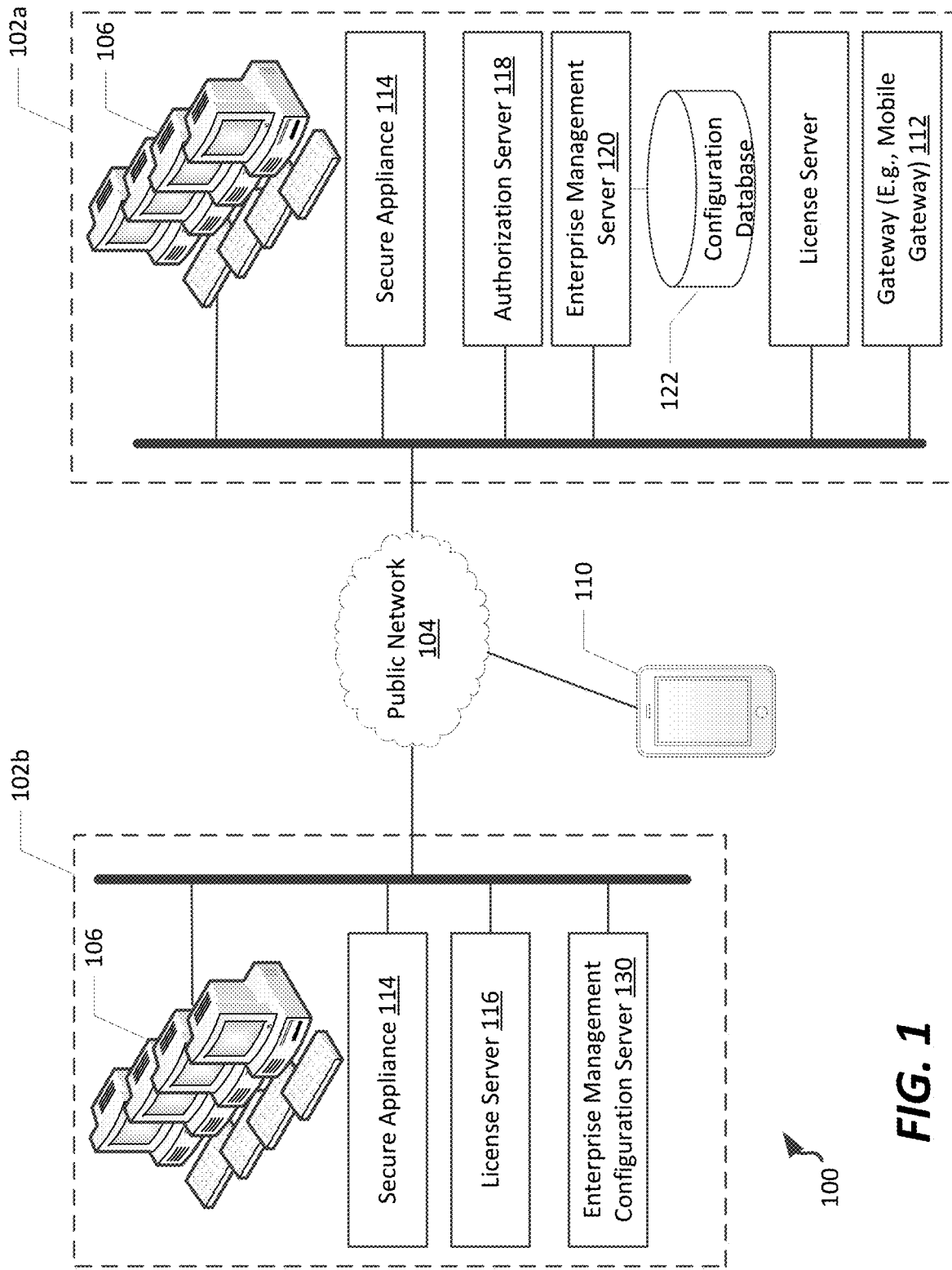
FIG. 1 illustrates a schematic view of an enterprise network distributed across premises, representing an example network in which aspects of the present disclosure can be implemented.

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

The logical operations of the various embodiments of the disclosure described herein are implemented as: (1) a sequence of computer implemented steps, operations, or procedures running on a programmable circuit within a computer, and/or (2) a sequence of computer implemented steps, operations, or procedures running on a programmable circuit within a directory system, database, or compiler.

In general, the present disclosure relates to methods and systems for customizing classifications of devices within an enterprise security management tool. Such classifications can be used to group nodes within an enterprise by behavior into profiles, and such classifications can further be used to define security policy settings that will ultimately be deployed to each node. Classifications can be predefined, or in accordance with the present disclosure, either predefined or customized by a user, such as a security administrator within an enterprise network.

Although many predefined classifications can be provided as noted above, this is still inadequate to address particular needs of unique organizations. Accordingly, use of such customized classifications allows the security administrator greater flexibility to group nodes into profiles in a way that makes sense with respect to use of computing resources for that particular organization, and further allows the user of the enterprise security management tool to utilize additional automating features of that tool without requiring substantial manual customization of settings after a project is created.

Additionally, in some aspects, additional tools for defining service names that are produced and/or consumed by protocols or nodes falling within certain classifications of profiles are provided. Such definition of service names allows for improved flexibility with respect to port and protocol combinations that may be uniquely used within particular enterprise networks, allowing a security administrator to define such unique services within their network, while maintaining user interfaces logically depicting a network to be as simple as possible, thereby making security management more useable and straightforward.

By way of background, enterprises implementing security systems in which traffic among nodes within the enterprise network is secured must be configured using complex security policies that are coordinated to ensure that the various endpoints, or nodes, have access to various system resources that may be needed by that node or endpoint. One example of such a security system that can be implemented is the Stealth enterprise security solution from Unisys Corporation of Blue Bell, Pa. Generally, such a system is implemented using an enterprise management server that maintains security policies for various network endpoints, and distributes security policies to those endpoints, in terms of encryption keys that define communities of interest within the enterprise as well as filter lists identifying permitted and forbidden traffic patterns from each endpoint. One particular attribute of the Stealth solution is that for entities not included within a particular community of interest, the resource that is protected using that solution is not visible, and therefore would not be a hacking target (e.g., for DDOS attacks, or other types of attacks) given that its network address would not be known.

Due to the complexity of enterprise security policies and enterprise topologies, establishing an enterprise security policy that can apply across an entire enterprise is complex. To simplify the complexity of such policy definition, the present Applicant has developed an enterprise security management configuration tool. Aspects of such a tool are described in the following U.S. patent applications, the disclosure of which is hereby incorporated by reference in their entireties: U.S. patent application Ser. No. 15/494,852; U.S. patent application Ser. No. 15/494,869; U.S. patent application Ser. No. 15/494,896; and U.S. patent application Ser. No. 15/494,907.

Within the tool described in the above-referenced applications, each node within an enterprise can be grouped into a "profile" which is generally a defined classification of a type of node. A classification is generally defined as a collection of a number of heuristics that describe the classification of a node type, for purposes of forming one or more profiles from such a classification; a heuristic, as that term is used herein, are rules that examine network traffic data (e.g. concordance data) to assist in classification of nodes correctly. The profile can be defined by activity of the node, e.g., the types of services it provides to or consumes from other nodes, the ports it accesses, etc. Once nodes are classified, an affinitization tool can assess, based on the classifications and concordance data, how best to arrange nodes into profiles, e.g., based on a level of similarity among the nodes. However, in the above-referenced U.S. applications, the enterprise security management tool provides a preset collection of profiles into which nodes can be classified. Once nodes are classified and an affinitization operation is performed, if a profile is incorrectly defined (i.e., defined in a way than is different than desired for a given enterprise), a solution definition (e.g., a representation of the enterprise topology in which security policies can be defined) would need to be manually adjusted for each node that is incorrectly grouped into a profile with other nodes that the enterprise's security administrator wishes to manage differently/separately. This adjustment after a security policy solution is already defined is highly inefficient for an enterprise security administrator. Accordingly, customizations of classifications of nodes and profiles, and customizations of the services that can be used to define those nodes and profiles (and which define specific channels) improves useability of the enterprise security management tool greatly, and provides more streamlined and granular control over definition of security policies within an enterprise within a convenient graphical interface.

I. Enterprise Security Configuration Server and Environment

As noted above, solutions for creating enterprise security policies are complex. As such, an enterprise security configuration server is included in example networks in which such security deployments are performed, and can create solutions for import into an enterprise server for distribution across an enterprise in a straightforward manner. FIGS. 1-5 illustrate example computing systems useable to implement an enterprise network and deploy security settings in such a network. FIGS. 6-25 illustrate an overall enterprise security management tool and methods of its use, with FIGS. 7-20 illustrating utilization of custom classifications within such an enterprise security management configuration tool, and advantages of use of such custom classifications and service definitions. FIGS. 21-27 illustrate the application of such custom classifications as may be deployed within an enterprise network.

Referring now to FIG. 1, a schematic view of one example enterprise network 100 is illustrated. The enterprise network 100 is distributed across premises, and therefore includes at least a first premises 102*a* and a second premises 102*b* separated by a network 104, which can in some cases represent an at least partially public network, such as the Internet. The enterprise network 100 includes a plurality of endpoints 106. The endpoints 106 can be, for example, servers or workstations operable or accessible by a user to perform various tasks germane to the enterprise.

Users of such endpoints in this context may be associated with the enterprise and may be afforded access to computing resources at the endpoints 106; in such cases, different users may have different access rights to data or resources included in the enterprise. Accordingly, users are, via a management system, separated into defined communities of interest (COIs) which allows for common access rights to a group of users. The common access rights may be, in a corporate context, access rights associated with a particular department or project; in other contexts, access rights may be defined by a particular security clearance, membership in a particular group, or having a particular interest in common data or applications.

In the embodiment shown, each of the premises 102*a-b* have a plurality of endpoints 106 located within the premises. In such arrangements, the endpoints 106 can be interconnected at each of the premises using standard communications equipment (not shown) such as routers, switches, and cabling. In some embodiments, the endpoints 106 can be virtualized endpoints maintained on one or more servers. In such cases, one possible implementation of such an arrangement could be provided using S-Par Secure Partitioning platform provided by Unisys Corporation of Blue Bell, Pa. Other virtualization systems could be used as well.

It is noted that, in addition to endpoints 106 at premises 102*a-b*, other access mechanisms to the enterprise network 100 may be desirable as well. For example, in the embodiment shown a mobile device 110 may be used to access data or computing resources of the enterprise. In some embodiments, the mobile device 110 can establish a secure connection with a mobile gateway, such as gateway 112 which can act as a proxy for the mobile device 110 within the network, including receiving access to other endpoints within the network based on a community of interest of the user associated with the mobile device 110.

Referring to the premises 102*a-b* generally, it is noted that in the embodiment shown, each premises may include a secure appliance 114. The secure appliance can manage secure communications among endpoints 106 or between premises 102*a-b*. In example embodiments, the secure appliance 114 can be used to deliver encryption keys or encryption features (e.g., a driver with which endpoints can secure data for communication) for endpoints. In alternative embodiments, the secure appliance 114 may not be needed by some or all endpoints; in such arrangements, a native security feature, such as IPsec, could be used by the endpoints to ensure security within a premises 102, or between premises 102*a-b* generally. In such cases, encryption keys and standards can be defined centrally, for example using the management server described herein, to establish different keys and different communities of interest for use by the authorized users of endpoints across the premises 102*a-b*.

Additionally, in the embodiment shown, one or both premises 102*a-b* can include a license server 116. The license server 116 can manage and track license usage by the endpoints 106. For example one or more endpoints 106 may request a license to particular software or to a particular network resource. In such cases, the license server 116 can be contacted to grant or deny a license to such software or resource, based on a number of licenses available and whether the user of the endpoint is authorized to use such software or resource.

Additionally, in the embodiment shown, an authorization server 118 can be provided at one or more of the premises 102. The authorization server 118 can be accessed by an endpoint that is seeking authorization to access other resources within the network. Generally, the authorization server 118 can establish a secure communication session with that endpoint to provide authorization information (keys, settings, COI filters, etc.) to allow that endpoint to communicate with other endpoints within the network.

In addition to the above, a management server 120 is located at one of the premises 102*a-b*. The management server 120 provides a universally-accessible access location at which management settings can be viewed, enterprise access attempts logged, license tracking can be managed, and security arrangements defined, including definition of encryption policies, communities of interest, enterprise resources available, and other features. Additional details regarding operation of the management server are described in U.S. patent application Ser. No. 14/688,348, entitled 'Enterprise Management for Secure Network Communications over IPSec", assigned to Unisys Corporation of Blue Bell, Pa., the disclosure of which is hereby incorporated by reference in its entirety.

Generally, the management server 120 is communicatively connected to a configuration database 122 (e.g., by hosting the configuration database or being communicatively connected to a separate computing system or systems that host that database). The configuration database generally stores configuration settings included in one or more configuration profiles for the enterprise network; and one or more interface definitions useable by the web interface to provide administrative access to the configuration settings. Details regarding the data stored in the configuration database are provided in U.S. patent application Ser. No. 14/688, 348, entitled 'Enterprise Management for Secure Network Communications over IPSec", the disclosure of which was previously incorporated by reference.

Enterprise management within the enterprise network 100 can be distributed among one or more of the management server 120, authorization server 118, license server 116, and secure appliance 114. Enterprise management provides the general management and control for servers using the Stealth security features of an enterprise network, and in particular Stealth installations that apply IPsec-based security. Each enterprise network, or enclave, can have a management instance that performs various user authentication, logging, licensing, certificate management, administration, web services, and software update features. Regarding authorization, the management service can ensure that a user is authenticated and authorized when logging on to the endpoint 106. The endpoint 106 receives an Authorization Token (AuthToken) that identifies the user's COI membership status.

The management server 120 hosts a management service that can also receive log information to be recorded, and can issue commands to the server to control its behavior or to request status information. This includes retrieving debugging information regarding security software installed through the enterprise. The management service also controls licensing, for example by installing a license System Control Number (SCN) and license values (strings) on a license host, such as either the management server 120 or the authorization server 118. Remote authorization servers, such as authorization server 118, communicate with a license host to share its licenses. The management service also performs certificate management to maintain the certificates used for authentication.

Administrative users of the enterprise network 100, and management server 120 specifically, will use a GUI to control account management, role-based authorization, certificate management, and other administrative tasks. In some embodiments, a web services interface is provided to allow network access to management services. Additionally, the enterprise management features of the present disclosure are configurable to inventory levels of installed software and provide for software updates. This may include updates for endpoints as well as the management service itself.

In addition to the above, an enterprise management configuration server 130 can be included within the enterprise network 100. The enterprise management configuration server 130 generates a user interface at which security policies can be generated, for import into the management server 120 and configuration database 122. Although shown at premises 102b, it is understood that the enterprise management configuration server 130 could be located at a same location as the management server 120, or indeed be implemented on the same physical computing system as the management server 120, in alternative implementations.

In general, although the enterprise network 100 as shown is disclosed as having a plurality of premises 102a-b and a single management server 120, it is noted that other arrangements may exist in which management servers 120 can be distributed at one or more distributed locations, each of which are configured to communicate with an instance of the configuration database 122. Furthermore, one or more of those management servers 120 can be maintained as a redundant management server that is accessed in the event of failure of a primary management server. Additionally, since the management server 120 can be, in some embodiments, implemented as a process that executes within a computing environment, functionality of the management server can be combined with that of other systems on a single computing system or separated onto different computing systems; in some embodiments, a user interface server, management server, authorization server, license server, and/or other enterprise network security services can be located on separate servers, while in other embodiments two or more of these services can be combined on a single device (e.g., a discrete physical computing device or a virtual computing device installed on a partition of a physical computing device). Accordingly, enterprise management configuration server 130 can be configured to distribute security policy configurations to one or more management servers 120, or different security policies (or portions of a common security policy, as discussed further below) to different management servers.

Figure 2:
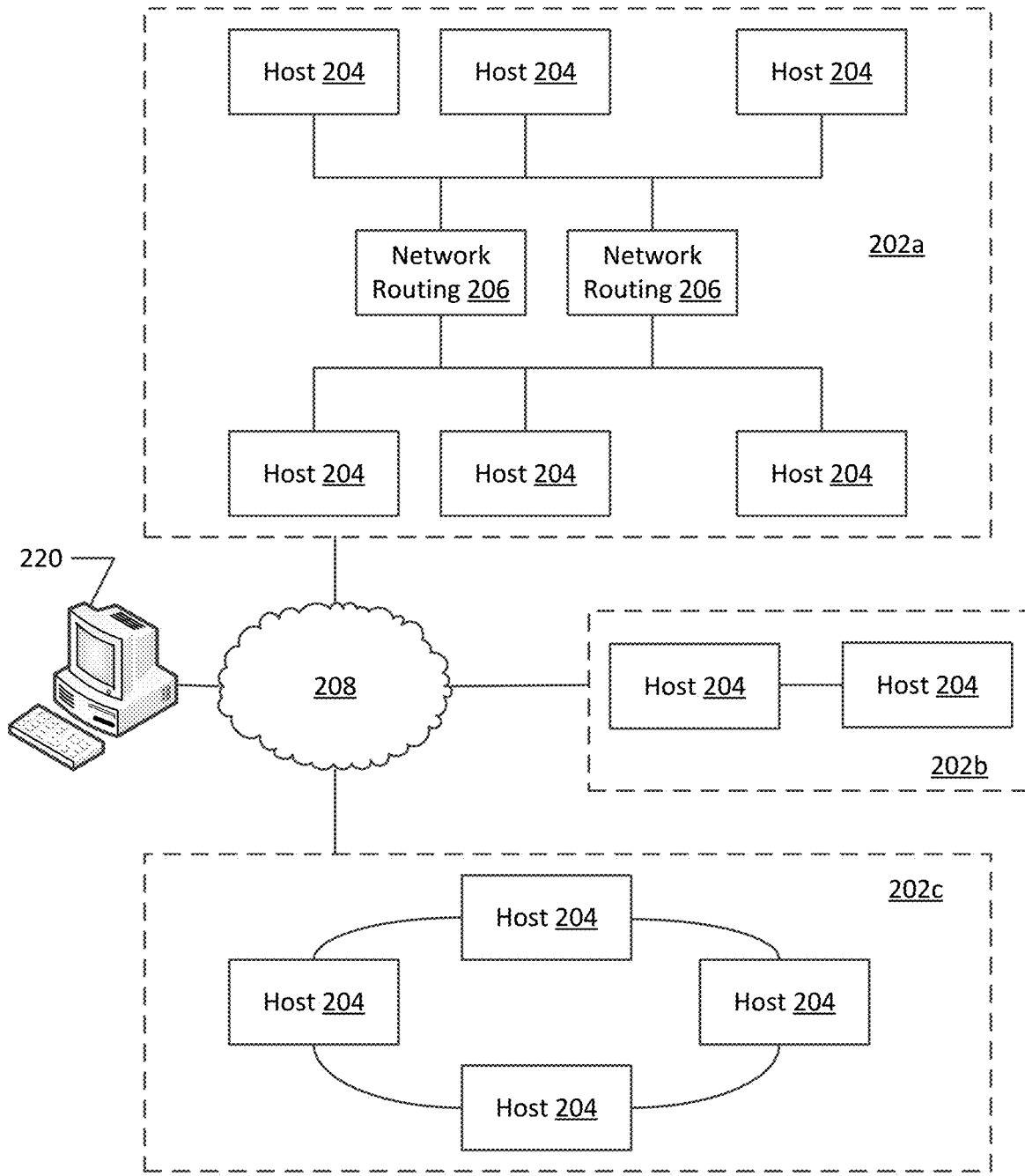
FIG. 2 illustrates a distributed multi-host system in which aspects of the present disclosure can be implemented.
Figure 3:
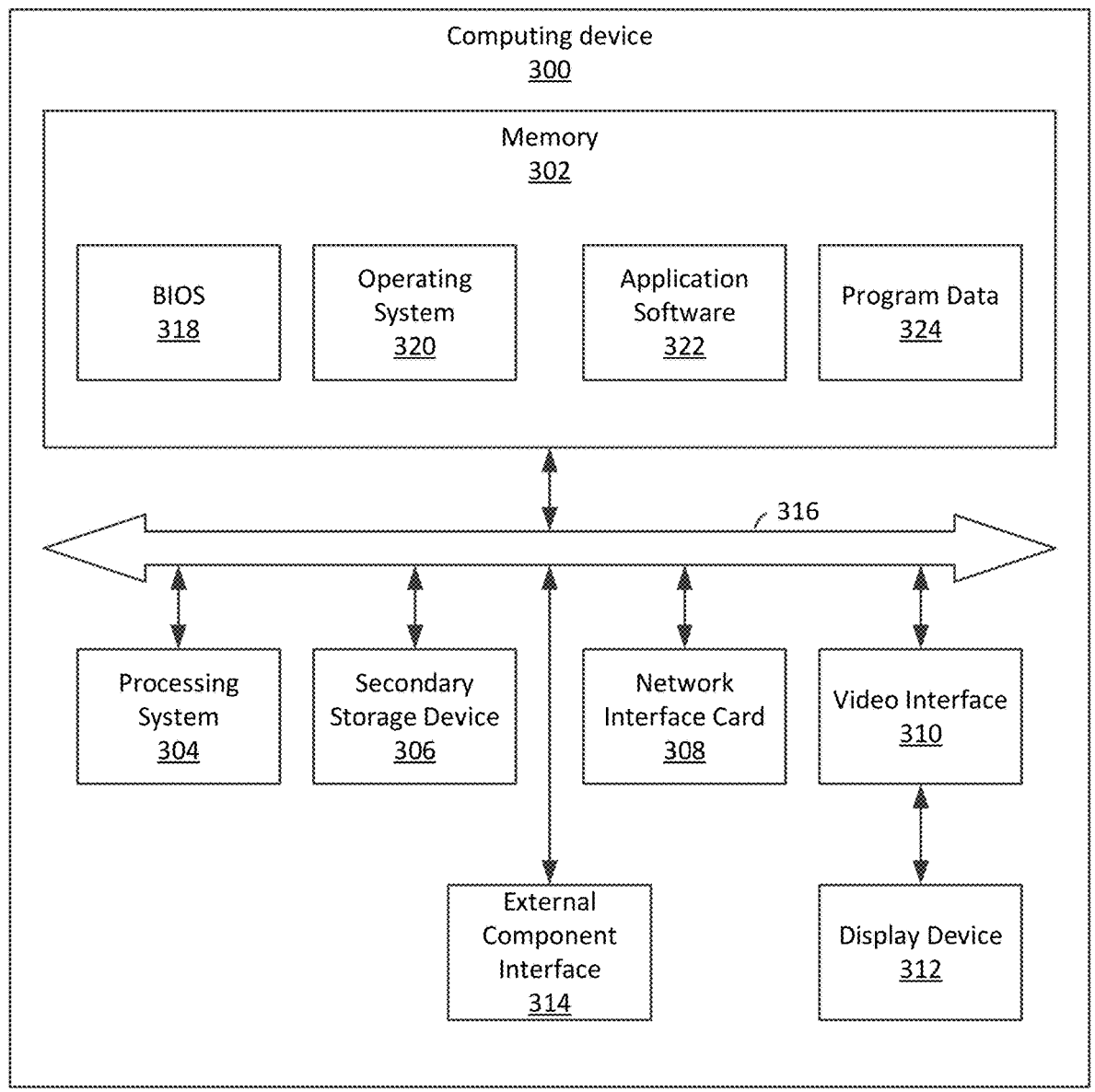
FIG. 3 is a schematic illustration of an example computing system in which aspects of the present disclosure can be implemented.

Referring now to FIG. 2, a distributed multi-host system 200 is shown in which aspects of the present disclosure can be implemented. The system 200 represents a possible arrangement of computing systems or virtual computing systems useable to implement the enterprise network of FIG. 1. In the embodiment shown, the system 200 is distributed across one or more locations 202, shown as locations 202a-c. These can correspond to locations remote from each other, such as a data center owned or controlled by an organization, a third-party managed computing cluster used in a "cloud" computing arrangement, or other local or remote computing resources residing within a trusted grouping. In the embodiment shown, the locations 202a-c each include one or more host systems 204, or nodes. The host systems 204 represent host computing systems, and can take any of a number of forms. For example, the host systems 204 can be server computing systems having one or more processing cores and memory subsystems and are useable for large-scale computing tasks. In one example embodiment, a host system 204 can be as illustrated in FIG. 3.

As illustrated in FIG. 2, a location 202 within the system 200 can be organized in a variety of ways. In the embodiment shown, a first location 202a includes network routing equipment 206, which routes communication traffic among the various hosts 204, for example in a switched network configuration. Second location 202b illustrates a peer-to-peer arrangement of host systems. Third location 202c illustrates a ring arrangement in which messages and/or data can be passed among the host computing systems themselves, which provide the routing of messages. Other types of networked arrangements could be used as well.

In various embodiments, at each location 202, the host systems 204 are interconnected by a high-speed, high-bandwidth interconnect, thereby minimizing latency due to data transfers between host systems. In an example embodiment, the interconnect can be provided by an Infiniband switched fabric communications link; in alternative embodiments, other types of interconnect technologies, such as Fibre Channel, PCI Express, Serial ATA, or other interconnect could be used as well.

Among the locations 202a-c, a variety of communication technologies can also be used to provide communicative connections of host systems 204 at different locations. For example, a packet-switched networking arrangement, such as via the Internet 208, could be used. Preferably, the interconnections among locations 202a-c are provided on a high-bandwidth connection, such as a fiber optic communication connection.

In the embodiment shown, the various host system 204 at locations 202a-c can be accessed by a client computing system 220 such as the endpoints 106 of FIG. 1. The client computing system can be any of a variety of desktop or mobile computing systems, such as a desktop, laptop, tablet, smartphone, or other type of user computing system. In alternative embodiments, the client computing system 220 can correspond to a server not forming a cooperative part of the para-virtualization system described herein, but rather which accesses data hosted on such a system. It is of course noted that various virtualized partitions within a para-virtualization system could also host applications accessible to a user and correspond to client systems as well.

It is noted that, in various embodiments, different arrangements of host systems 204 within the overall system 200 can be used; for example, different host systems 404 may have different numbers or types of processing cores, and different capacity and type of memory and/or caching subsystems could be implemented in different ones of the host system 404. Furthermore, one or more different types of communicative interconnect technologies might be used in the different locations 202a-c, or within a particular location.

Referring now to FIG. 3, a schematic illustration of an example discrete computing system in which aspects of the present disclosure can be implemented. The computing device 300 can represent, for example, a native computing system within which one or more of servers 116-120, 130 can be implemented, or an implementation of an endpoint 106, or mobile device 110 (a.k.a., nodes). In particular, the computing device 300 represents the physical construct of an example computing system at which an endpoint or server could be established. In some embodiments, the computing device 300 implements virtualized or hosted systems, and executes one particular instruction set architecture while being used to execute non-native software and/or translate non-native code streams in an adaptive manner, for execution in accordance with the methods and systems described herein.

In the example of FIG. 3, the computing device 300 includes a memory 302, a processing system 304, a secondary storage device 306, a network interface card 308, a video interface 310, a display unit 312, an external component interface 314, and a communication medium 316. The memory 302 includes one or more computer storage media capable of storing data and/or instructions. In different embodiments, the memory 302 is implemented in different ways. For example, the memory 302 can be implemented using various types of computer storage media.

The processing system 304 includes one or more processing units. A processing unit is a physical device or article of manufacture comprising one or more integrated circuits that selectively execute software instructions. In various embodiments, the processing system 304 is implemented in various ways. For example, the processing system 304 can be implemented as one or more physical or logical processing cores. In another example, the processing system 304 can include one or more separate microprocessors. In yet another example embodiment, the processing system 304 can include an application-specific integrated circuit (ASIC) that provides specific functionality. In yet another example, the processing system 304 provides specific functionality by using an ASIC and by executing computer-executable instructions.

The secondary storage device 306 includes one or more computer storage media. The secondary storage device 306 stores data and software instructions not directly accessible by the processing system 304. In other words, the processing system 304 performs an I/O operation to retrieve data and/or software instructions from the secondary storage device 306. In various embodiments, the secondary storage device 306 includes various types of computer storage media. For example, the secondary storage device 306 can include one or more magnetic disks, magnetic tape drives, optical discs, solid state memory devices, and/or other types of computer storage media.

The network interface card 308 enables the computing device 300 to send data to and receive data from a communication network. In different embodiments, the network interface card 308 is implemented in different ways. For example, the network interface card 308 can be implemented as an Ethernet interface, a token-ring network interface, a fiber optic network interface, a wireless network interface (e.g., WiFi, WiMax, etc.), or another type of network interface.

The video interface 310 enables the computing device 300 to output video information to the display unit 312. The display unit 312 can be various types of devices for displaying video information, such as an LCD display panel, a plasma screen display panel, a touch-sensitive display panel, an LED screen, a cathode-ray tube display, or a projector. The video interface 310 can communicate with the display unit 312 in various ways, such as via a Universal Serial Bus (USB) connector, a VGA connector, a digital visual interface (DVI) connector, an S-Video connector, a High-Definition Multimedia Interface (HDMI) interface, or a DisplayPort connector.

The external component interface 314 enables the computing device 300 to communicate with external devices. For example, the external component interface 314 can be a USB interface, a FireWire interface, a serial port interface, a parallel port interface, a PS/2 interface, and/or another type of interface that enables the computing device 300 to communicate with external devices. In various embodiments, the external component interface 314 enables the computing device 300 to communicate with various external components, such as external storage devices, input devices, speakers, modems, media player docks, other computing devices, scanners, digital cameras, and fingerprint readers.

The communication medium 316 facilitates communication among the hardware components of the computing device 300. In the example of FIG. 3, the communications medium 316 facilitates communication among the memory 302, the processing system 304, the secondary storage device 306, the network interface card 308, the video interface 310, and the external component interface 314. The communications medium 316 can be implemented in various ways. For example, the communications medium 316 can include a PCI bus, a PCI Express bus, an accelerated graphics port (AGP) bus, a serial Advanced Technology Attachment (ATA) interconnect, a parallel ATA interconnect, a Fiber Channel interconnect, a USB bus, a Small Computing system Interface (SCSI) interface, or another type of communications medium.

The memory 302 stores various types of data and/or software instructions. For instance, in the example of FIG. 3, the memory 302 stores a Basic Input/Output System (BIOS) 318 and an operating system 320. The BIOS 318 includes a set of computer-executable instructions that, when executed by the processing system 304, cause the computing device 300 to boot up. The operating system 320 includes a set of computer-executable instructions that, when executed by the processing system 304, cause the computing device 300 to provide an operating system that coordinates the activities and sharing of resources of the computing device 300. Furthermore, the memory 302 stores application software 322. The application software 322 includes computer-executable instructions, that when executed by the processing system 304, cause the computing device 300 to provide one or more applications. The memory 302 also stores program data 324. The program data 324 is data used by programs that execute on the computing device 300. Example program data and application software is described below in connection with FIGS. 4-5.

Although particular features are discussed herein as included within a computing device 300, it is recognized that in certain embodiments not all such components or features may be included within a computing device executing according to the methods and systems of the present disclosure. Furthermore, different types of hardware and/or software systems could be incorporated into such an electronic computing device.

In accordance with the present disclosure, the term computer readable media as used herein may include computer storage media and communication media. As used in this document, a computer storage medium is a device or article of manufacture that stores data and/or computer-executable instructions. Computer storage media may include volatile and nonvolatile, removable and non-removable devices or articles of manufacture implemented in any method or technology for storage of information, such as computer readable instructions, data structures, program modules, or other data. By way of example, and not limitation, computer storage media may include dynamic random access memory (DRAM), double data rate synchronous dynamic random access memory (DDR SDRAM), reduced latency DRAM, DDR2 SDRAM, DDR3 SDRAM, solid state memory, read-only memory (ROM), electrically-erasable programmable ROM, optical discs (e.g., CD-ROMs, DVDs, etc.), magnetic disks (e.g., hard disks, floppy disks, etc.), magnetic tapes, and other types of devices and/or articles of manufacture that store data. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. Computer storage media does not include a carrier wave or other propagated or modulated data signal. In some embodiments, the computer storage media includes at least some tangible features; in many embodiments, the computer storage media includes entirely non-transitory components.

In general the endpoints of the present disclosure can be configured various ways, with registry settings selected to configure the endpoint to communicate according to an appropriate communication protocol. In some example embodiments, each IPv6-based system includes a capability to communicate with the authorization server via either IPv4 or IPv6 communications. Other administrator-selected IP-based protocols could be used as well.

Figure 4:
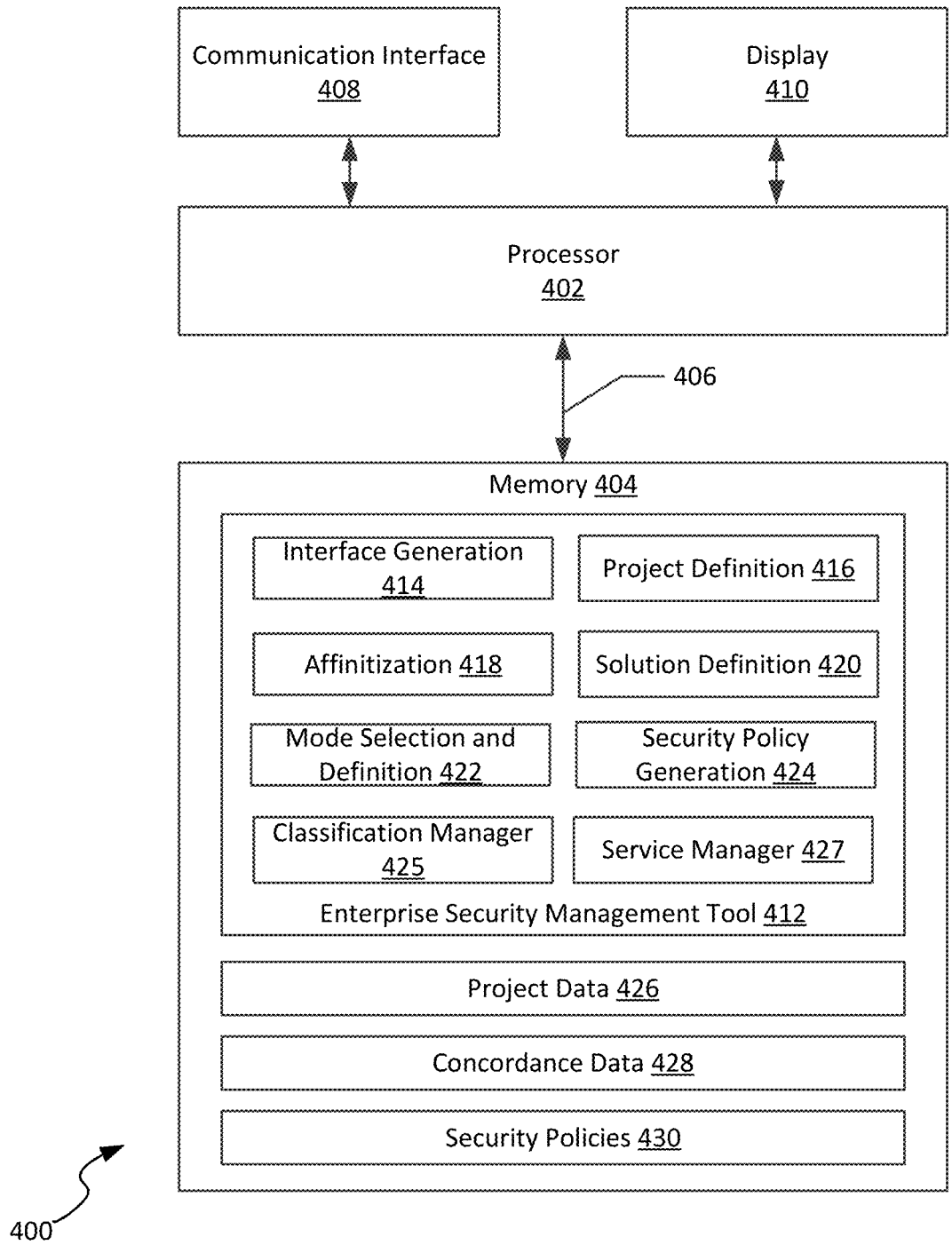
FIG. 4 is a schematic illustration of an example computing system useable within the enterprise network as an enterprise security management configuration server.

FIG. 4 is a schematic illustration of an example computing system useable within the enterprise network as an enterprise security management configuration server, such as the enterprise management configuration server 130 of FIG. 1.

In general, the computing system 400 includes a processor 402 communicatively connected to a memory 404 via a data bus 406. The processor 402 can be any of a variety of types of programmable circuits capable of executing computer-readable instructions to perform various tasks, such as mathematical and communication tasks, such as those described above in connection with FIG. 3. The memory 404 can include any of a variety of memory devices, such as using various types of computer-readable or computer storage media, as also discussed above. In the embodiment shown, the memory 404 stores a query formulation application 412, discussed in further detail below. The computing system 400 can also include a communication interface 408 configured to receive and transmit data, for example to access data in an external database, such as database 122 of FIG. 1, or to serve a web interface useable to configure security settings within an enterprise, as discussed herein. Additionally, a display 410 can be used for viewing a local version of a user interface, as described herein. via an enterprise security management tool 412.

In various embodiments, the enterprise security management tool 412 generally is configured to generate a configuration user interface accessible by a security administrator of an enterprise to simplify creation and deployment of security policies across the enterprise. In the example embodiment shown, the enterprise security management tool 412 includes an interface generation component 414, a project definition component 416, an affinitization component 418, a solution definition component 420, a mode selection and definition component 422, a security policy generation component 424, a classification manager 425, and a service manager 427. As further outlined below, the memory 404 can include project data 426, concordance data 428, and security policies 430.

In example embodiments, the interface generation component 414 can be configured to generate and serve a configuration user interface, such as is explained fully both below and in conjunction with the following copending U.S. patent applications, each of which were previously incorporated by reference in their entireties: U.S. patent application Ser. No. 15/494,852; U.S. patent application Ser. No. 15/494,869; U.S. patent application Ser. No. 15/494,896; and U.S. patent application Ser. No. 15/494,907.

The configuration user interface presents to a security administrator a simplified topology of an enterprise network, and allows for grouping of nodes (e.g., servers and endpoints) that are commonly secured using similar security policy settings, and allows for automatic grouping and default security settings to simplify security policy deployment. A project definition component 416 is configured to manage a project, which refers to a container for saved work associated with security configuration settings.

An affinitization component 418 is configured to determine an extent of similarity among nodes in an enterprise network, and in some embodiments group those nodes into "profiles" or collections of similar-acting nodes. For example, a profile may contain a set of application servers that serve a common application, or redundant database servers, or web servers, or even user endpoints having common communication patterns. Although the servers or nodes grouped into a profile may operate somewhat differently, in some embodiments (discussed in further detail below) the affinitization component can determine a level of similarity between nodes and group those nodes that have a similarity above a specified "affinitization threshold". That threshold may be set using a simple user interface feature, as further discussed below. Furthermore, affinitization can be set automatically using such a threshold, or can be set manually by grouping a set of nodes within a profile "container" that can be created using the configuration user interface. As further discussed below, the grouped nodes within the profile can be treated similar to one another, by assigning a set of common security settings (e.g., common filter lists, security enablement/disablement, communities of interest, etc.).

A solution definition component 420 is configured to define one or more solutions in the configuration user interface. Each solution can be made up of two or more profiles (and likely a channel, indicating some communicative relationship between those profiles). While affinitized nodes in a profile will typically have common security settings because of common usage, profiles within a solution may have the same or only similar security settings based on the common data shared among those profiles, or that the profiles cooperate to serve end-users in a particular manner. In various embodiments, the solution definition component 420 can include an automated solution definition option in which the enterprise security management tool identifies root and chained profiles that should be included in a solution or solutions in the enterprise network. In still further embodiments, the solution definition component 420 can also, or in the alternative, include a manual solution definition option in which the enterprise security management tool allows a user to define a root profile and one or more chained profiles as part of a solution. Examples of automatically generated and manually generated solutions are described in further detail below.

A mode selection and definition component 422 is configured to allow a user to select from among a plurality of different modes in which the enterprise security management tool can be used. For example, in a modeling mode (a default mode of the tool), a graphical user interface can be used to define security settings for export. However, a user may be presented with an option to switch to a simulation mode and/or a monitoring mode. In a simulation mode or monitoring mode, various tests can be run to verify consistency of security within the enterprise network, and alerts can be generated and graphically presented to a user to indicate areas of an enterprise network that are not secured, or for which unsecured traffic might be allowed to access data that is intended to be secured (either in a realtime or simulated situation, depending on the mode).

A security policy generation component 424 is configured to generate, based on the arrangement and settings defined using the configuration user interface of the enterprise security management configuration tool, to generate an exportable file that can be ingested by the management server 120 of FIG. 1, for population of the configuration database 122 and subsequent dispersion of security policy settings throughout the enterprise network. In example embodiments, the security policy generation component 424 can generate such a file based on all or part of a given project, for example by generating a file that updates security settings for an entire enterprise network, for one or more solutions, or one or more profiles. In specific embodiments, the file is constructed such that it is compliant with an application programming interface (API) exposed by the management server 120 for modifying security settings in the configuration database 122.

In the embodiment shown, the classification manager 425 is configured to allow a user to define custom classifications of nodes and/or profiles within the enterprise security management tool 412. For example, the classification manager 425 allows a user to define a new classification that can be used to group nodes into profiles or to define profiles as having a particular classification; such an arrangement allows earlier customization of nodes within a network, providing a more streamlined experience for security administrators seeking to correctly group nodes by logical association, since similarly-operating nodes will typically be provisioned with a similar (or same) security policy. Details regarding operation of the classification manager 425 are provided below in connection with FIGS. 7-17.

In the embodiment shown, the service manager 427 is configured to allow a user to provide custom definitions of services, which will appear in the tool as flows between nodes or profiles. For example, the service manager 427 allows a user to define a service in terms of a name, a port, and a protocol associated with that port and name. This named correspondence between port and protocol can be managed by the user and tracked to determine the number of classifications (preset or customized) utilize that service (e.g., the service is provided by or received by nodes corresponding to that profile), as well as a number of channels carrying the service and a number of overall projects within the tool that use that service. Such customized services can be used to help determine consumer/provider relationships among nodes within an enterprise network, and are used in conjunction with the custom classifications defined using the classification manager 425 to group nodes into profiles and/or solutions. Details regarding operation of the service manager are provided below in connection with FIGS. 18-20.

In the embodiment shown, the memory 404 can be configured to also store project data 426, concordance data 428, and security policies 430. This information generally represents the input, current state, and output of the enterprise security management tool as to one or more projects managed using that tool. Specifically, concordance data 428 can correspond to information regarding the identity and interactions of various endpoints and servers within an enterprise network. In some examples, a flow consists of a service having a consumer/provider relationship, defining a "friendship" between two nodes. In example embodiments, the concordance data, defining such flows and friendships, can include network logs captured at one or more endpoints, such as is discussed below in connection with FIG. 5. The project data 426 corresponds to a current state of a project, including any profiles (logical groupings of nodes), solutions (logical groupings of profiles), channels (communications detected between/among nodes and/or profiles), and/or any settings associated therewith, for example filter rules, security enablement/disenablement, or other security-based settings capable of being deployed by the management server 120. The security policies 430 correspond to the data output from the enterprise security management configuration tool, for ingestion by the management server 120.

Figure 5:
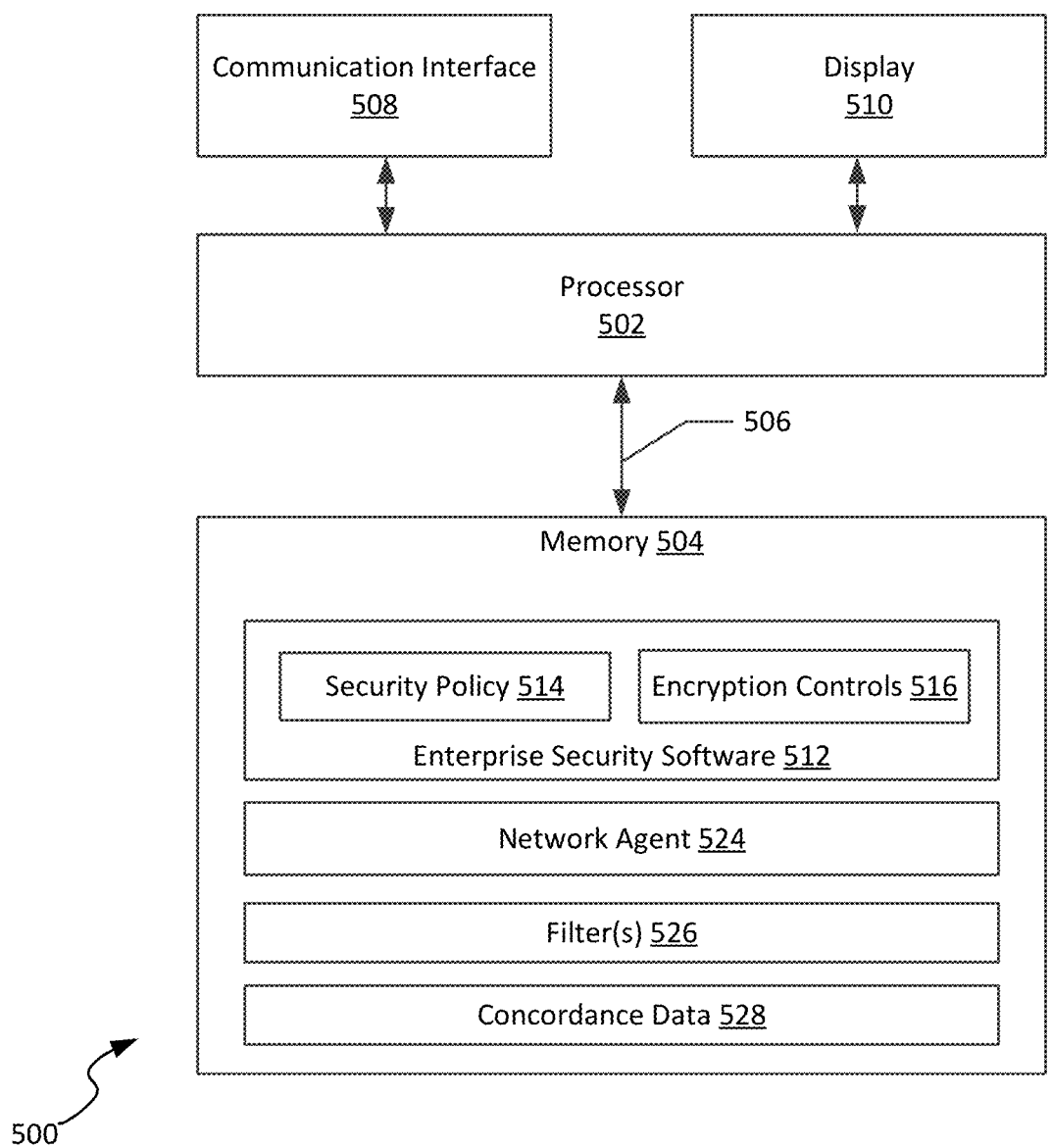
FIG. 5 is a schematic illustration of an example computing system useable within the enterprise network for which a security configuration can be deployed.

FIG. 5 is a schematic illustration of an example computing system 500 useable within the enterprise network for which a security configuration can be deployed. In general, the computing system 500 includes a processor 502 communicatively connected to a memory 504 via a data bus 506. The processor 502 can be any of a variety of types of programmable circuits capable of executing computer-readable instructions to perform various tasks, such as mathematical and communication tasks, such as those described above in connection with FIG. 3. The memory 504 can include any of a variety of memory devices, such as using various types of computer-readable or computer storage media, as also discussed above. In the embodiment shown, the memory 504 stores enterprise security software 512 and a network agent 524. The computing system 400 can also include a communication interface 508 configured to receive and transmit data, for example to interact with other nodes within or external to an enterprise network. Additionally, a display 510 can be included for user interaction.

The enterprise security software 512 is configured to control security in storage of data at and communication of data at the computing system 500, and between that system and remote systems. The enterprise security software includes a security policy 514 and encryption controls 516. The security policy 514 and encryption controls 516 can include settings as defined by an enterprise security management policy set at a management server, such as management server 120, which are received as filters 526. Details regarding deployment and use of such enterprise security software are provided in U.S. patent application Ser. No. 14/688,348, entitled 'Enterprise Management for Secure Network Communications over IPSec", the disclosure of which was previously incorporated by reference, as well as U.S. patent application Ser. No. 14/753,120, entitled "Secured Networks and Endpoints Applying Internet Protocol Security", and U.S. patent application Ser. No. 14/753,146, entitled "Secure Network Communications in a Mobile Device over IPsec", each assigned to Unisys Corporation of Blue Bell, Pa., the disclosures of each of which are hereby incorporated by reference in their entireties.

The network agent 524 is, in the embodiment shown, a network traffic monitor installed at the computing system 500 and configured to collect concordance data 528. In an example implementation, the concordance data 528 can correspond to network traffic data seen at the computing system 500, and can be uploaded to an enterprise security management configuration server for use as concordance data to determine, along with concordance data from other computing systems (nodes) within the enterprise network, affinities and communication channels among those nodes. In example embodiments, the network traffic can be captured in the form of a PCAP file containing network traffic at the computing system 500.

II. Defining Custom Classifications and Custom Services within Enterprise Security Management Configuration Tool Now referring specifically to FIGS. 6-17, details regarding use of an enterprise security management configuration server to configure an enterprise network are provided. Such configuration can be performed in an enterprise security management tool, such as tool 412 of FIG. 4, above, with other aspects of configuring security policies being performed within the enterprise security management tool 412 overall.

Figure 6:
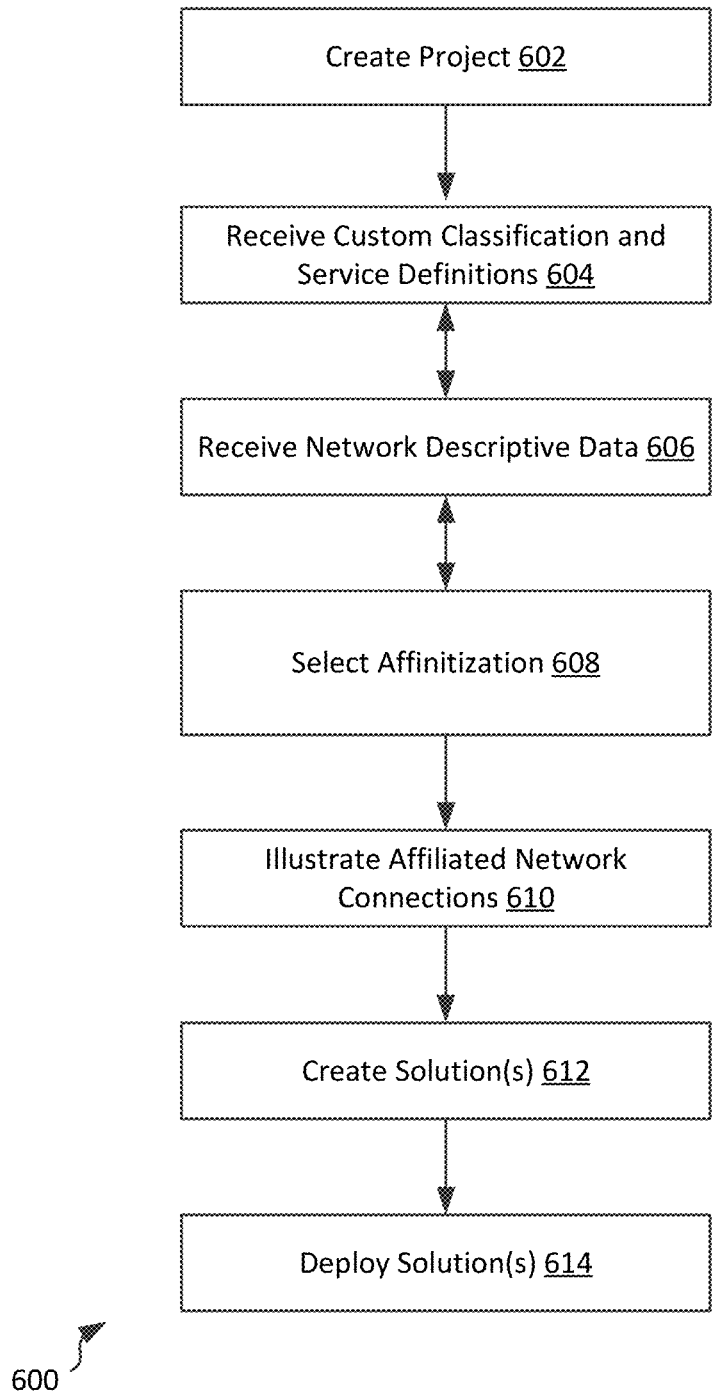
FIG. 6 is a flowchart of a method for configuring security management settings within an enterprise network, according to an example embodiment of the present disclosure.

FIG. 6 is a flowchart of a method 600 for configuring security management settings within an enterprise network, according to an example embodiment of the present disclosure. The method 600 can be performed, for example, at an enterprise security management configuration server, such as server 130 of FIG. 1.

In the example shown, the method 600 includes creating a project in an enterprise security management tool (step 602), and receiving one or more custom classifications or custom services of types of nodes and/or profiles within the tool (step 604). The custom classifications defined using the tool can be implemented as described below, and defined using the classification manager 425 of FIG. 4; similarly, the services defined using the tool can be implemented as described in FIGS. 18-20, below, and defined using the service manager 427 of FIG. 4.

In example embodiments, the method 600 further includes importing network concordance data into the tool (step 606). The network concordance data can be received from nodes within an enterprise network, such as the computing system 500 described above in connection with FIG. 5. The network concordance data can be aggregated, for example by the enterprise security management configuration server or a management server, such as management server 120 of FIG. 1.

In some examples, the concordance data can define the nodes and interconnections among the nodes that are included within the enterprise network. Optionally, a configuration user interface can display each of the nodes, and channels among the nodes, in such a configuration user interface, based on the flows and friendships defined in the concordance data. The selection of which nodes within an enterprise network from which to gather concordance data is a matter of choice, but to ensure a complete security solution, it is preferred to capture concordance data from an adequate number of nodes as will provide an accurate model of the enterprise network. For example, such concordance data could be gathered from each node intended to be secured.

In the example shown, the method 600 includes receiving a selection of an affinitization level to be used in grouping nodes into profiles (step 608). This can include presenting an affinitization tool to a user in a configuration user interface as part of a tool palette included therein, and receiving a selection of a specific setting for affinitization that defines a threshold similarity between concordance data of nodes before those nodes will be grouped into profiles. Upon selection of the affinitization level, the method 600 can include processing affinitization based on the concordance data, and updating a user interface to illustrate affiliated network connections in the form of profiles (step 610).

In the example shown, the method 600 also includes creating one or more solutions by grouping two or more profiles that are connected by a channel (step 612). As noted above, a solution generally corresponds to a logical grouping of one or more profiles, typically two or more profiles that are interconnected by a channel and which are likely to have common security settings based on the manner in which the profiles interact. For example, a database server, an application server communicatively connected to the database server, one or more web servers hosting web-based user interfaces for the application, and one or more load balancers distributing traffic within the group of application servers included within the profile of application servers, or other types of network devices likely to be required to share security policy settings due to shared data/network traffic. In example embodiments, creating one or more solutions can be performed automatically based on a methodology for automatically identifying a root profile (a likely starting point or source of data that may be delivered by way of a solution) and subsequently identifying one or more chained profiles, other than endpoints, that are logically connected. In alternative embodiments, creating solutions can be performed manually by manually identifying a root profile to be included in a solution, and dragging and dropping one or more other profiles interconnected to the root profile by a channel connected to the root profile into association with the solution within the configuration user interface.

In the example shown, the method 600 includes deploying one or more solutions to an enterprise management server (step 614). In example embodiments, deploying solutions includes deploying an entire project to an enterprise management server, such as management server 120. This can include generating a policy file that can be ingested by the management server 120, for storage of security settings in the configuration database 122. In other embodiments, deploying solutions includes receiving a selection of one or more solutions and generating a policy file directed only to portions of an enterprise network. Such a partial project deployment can be transmitted as one or more policy files distributed to one or more different management servers 120. The policy file, or security settings file, can be configured to describe security settings for operation and interactivity of each of the one or more nodes included in the identified one or more solutions, and is distributed to the configuration database 122 of associated management servers for distribution to such nodes. Details regarding distribution to the configuration database of custom classifications are provided with respect to FIGS. 22-25, below.

Generally, customization of classifications or solutions is performed using heuristics.

Referring to FIGS. 7-17, specific implementation details regarding enterprise security management tool are illustrated, and in particular with respect to configuration and use of custom classifications during definition of a "solution" within the enterprise security management tool.

Figure 7:
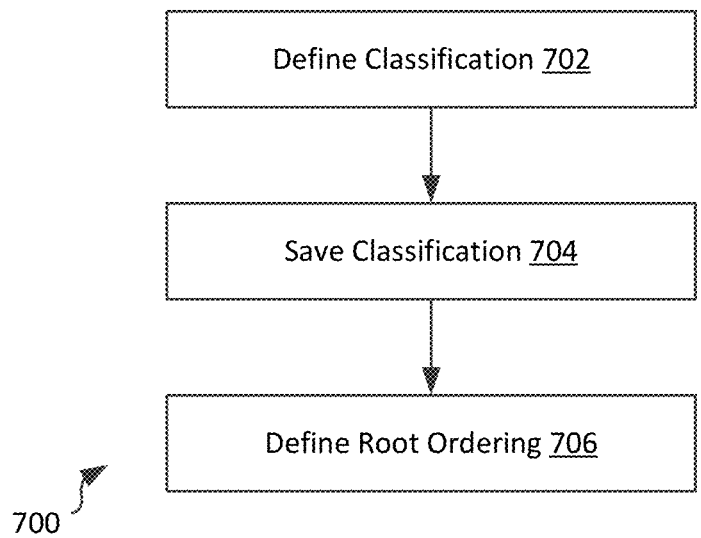
FIG. 7 is a flowchart of a method for defining customized classifications of nodes and profiles, within an enterprise security management configuration tool, according to an example embodiment of the present disclosure.

FIG. 7 is a flowchart of a method 700 for defining customized classifications of nodes and profiles, within an enterprise security management configuration tool, according to an example embodiment of the present disclosure. The method 700 can be performed using the defined using the classification manager 425 of FIG. 4, and represents one example implementation of method step 604 of FIG. 6.

In the embodiment shown, the method 700 includes defining a classification within the classification manager 425 (step 702). This can include providing a name for a custom classification, as well as sufficient information to define the nodes or profiles that are to be included within that classification. For example, a set of one or more ports, a type of communications protocol expected (e.g., TCP, UDP, etc.) and a definition of whether the node is a provider or consumer of such network traffic could be used. Other types of information could be used as well.

The method can also include saving the classification (step 704). This can include receiving selection of a "save classification" option within the classification manager, thereby causing update to a database of custom classifications that can be used across each of the projects managed using the enterprise security management tool described herein.

In the example shown, the method 700 optionally includes defining a root ordering (step 706). As further noted below, a root ordering priority defines how solutions may be formed, either manually or automatically, from collections of profiles. Generally, solutions correspond to logical groupings of interconnected nodes and/or profiles which have different functionality but which may intercommunicate or otherwise operate interdependently—e.g. a database server with a related application server that accesses that database server, one or more optional web servers providing a user front-end to the application(s) hosted by the application server, etc. By defining what can be a root profile within a solution (and the order in which the tool selects root profiles), solution definitions can be made more logically for a particular organization. In some embodiments, as further highlighted in the examples discussed below, a default set of root profiles may be selected, but is modifiable by a user, either to adjust ordering of the profiles or to add/remove profiles. For example, one or more profiles defined according to the custom classifications described herein could be added to a list of possible root profiles, and prioritized as desired among the set of default or predefined root profiles. In alternative embodiments, a root ordering can be predefined, and as such, root ordering step 706 can be excluded entirely from method 700.

Figure 8:
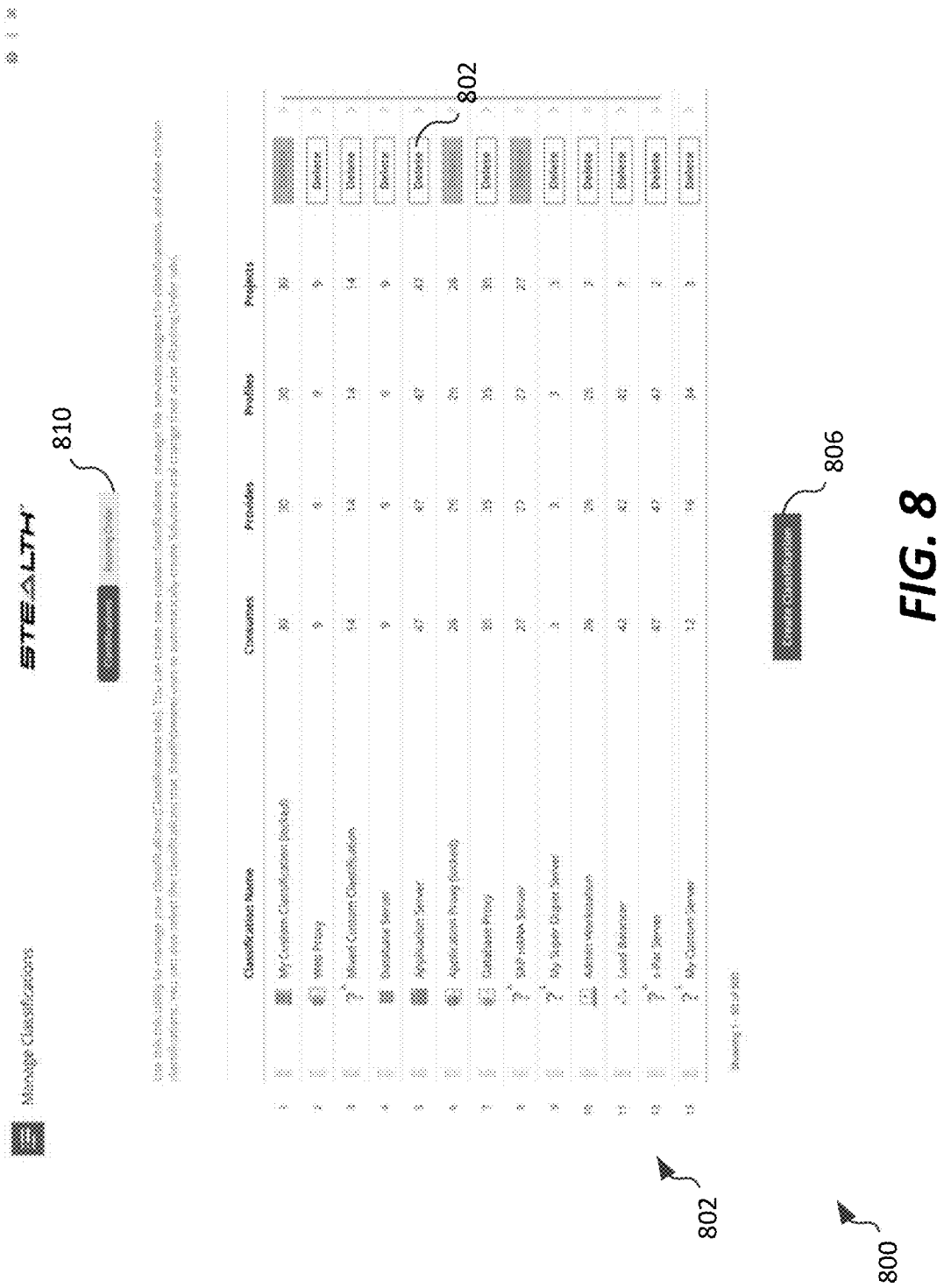
FIG. 8 is a configuration user interface of an enterprise security management tool in which classifications can be defined, according to an example embodiment.

Referring now to FIG. 8, an example configuration user interface 800 is shown, useable in example aspects of the enterprise security management tool. In the embodiment shown, the configuration user interface 800 includes a listing 802 of all classifications available within the tool, including both predefined classifications and custom, user-created classifications. Example predefined classifications can be those typically found in an enterprise; e.g., a database proxy, a database server, a web proxy, a web server, an admin user, an application server, an admin workstation, a workstation, a user. Optionally, a security management server, security authorization server, and secure or mixed-mode classifications could be used as predefined classifications. Each of the classifications in the list of classifications includes a classification name, a list of number of services it consumes and provides, a number of profiles that are classified according to that classification (across all projects managed by the tool) and a number of projects in which the classification appears. A delete option 804 is also associated with each entry in the listing; the delete option can be displayed in a manner that is selectable in the case of a user-defined or customized classification, or displayed in a manner which is not selectable in the case of a predefined classification (or some other classification that cannot be removed or deleted). A create classification button 806 allows a user to navigate to a new user interface in which the user can define a new custom classification.

Figure 16:
FIG. 16 illustrates a root ordering user interface for ordering of default and custom classifications as root nodes within a project, according to an example embodiment.
Figure 17:
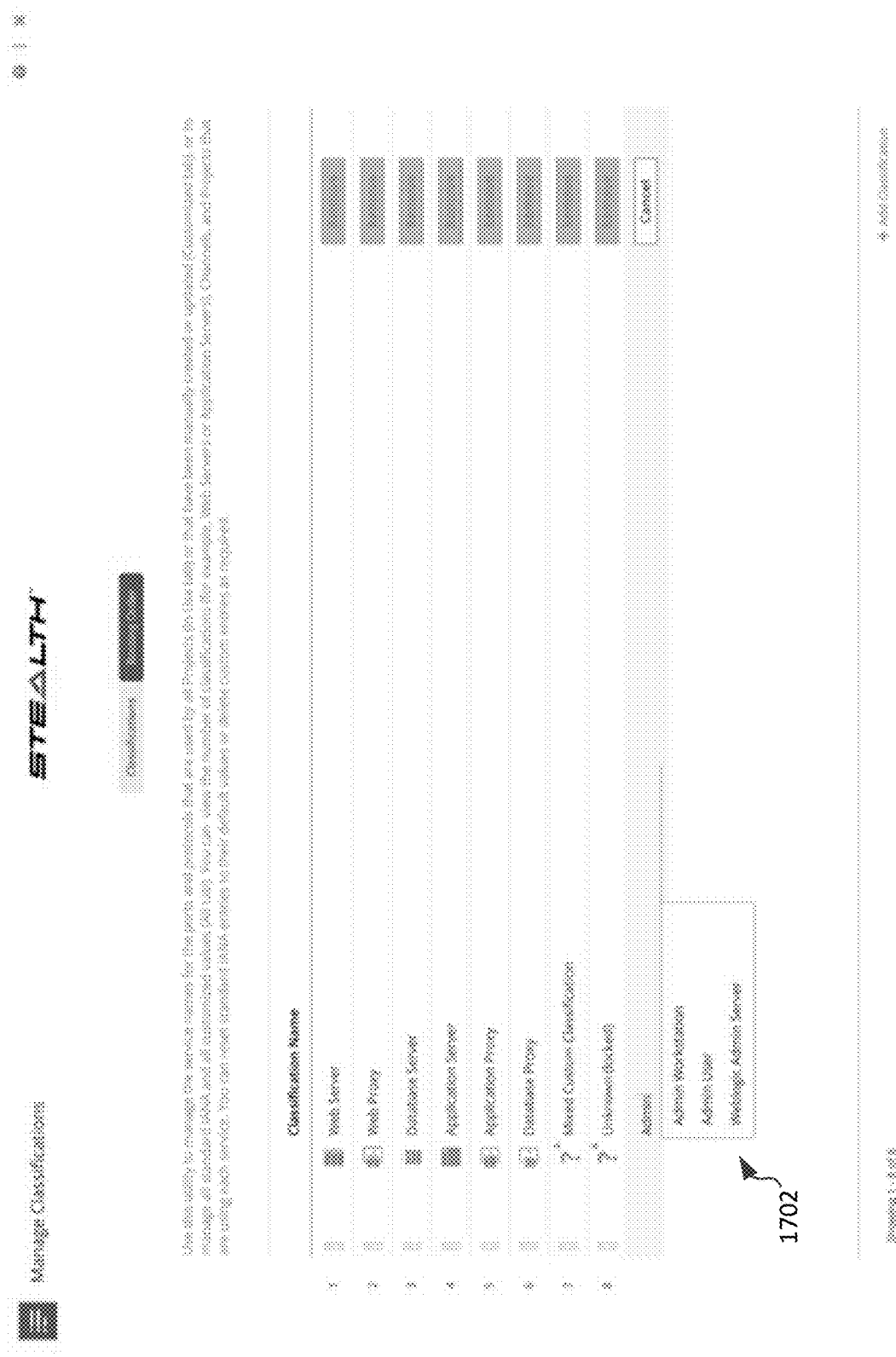
FIG. 17 illustrates addition of a custom classification to the root ordering user interface of FIG. 16, according to an example embodiment.

In the configuration user interface 800, a toggle 810 is provided that allows a user to toggle between the classification listing 802 and a rooting order list, such as is seen in FIGS. 16-17.

Figure 9:
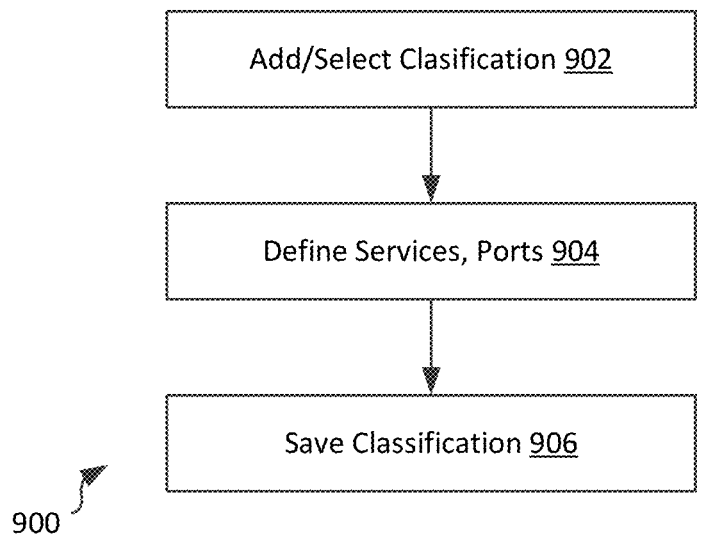
FIG. 9 is a flowchart of a method of defining a custom classification in an enterprise security management configuration tool, according to an example embodiment of the present disclosure.

Referring to FIG. 9, a method 900 of defining a custom classification in an enterprise security management configuration tool is shown, according to an example embodiment. The method 900 can be initiated upon selection of the create classification button 806 of FIG. 8, or selecting a preexisting custom classification for further editing, e.g., by selecting a particular classification from the listing 802. In the embodiment shown, the method 900 can include adding or selecting a classification (step 902), and upon selecting a particular classification to define, defining one or more services and/or ports that are affiliated with or are used at least in part to define nodes or profiles that fall within the classification. This can include, for example, defining specific consumer or provider services (e.g., whether the service is consumed or provided by nodes/profiles that are classified accordingly) as well as a port name or port range on which that service is communicated, as well as protocol for communication (e.g., TCP, UDP, etc.). The method 900 further includes saving the classification (step 906) which results in adding the classification to the listing 802 or updating the settings of an existing classification within the listing 802.

Figure 10:
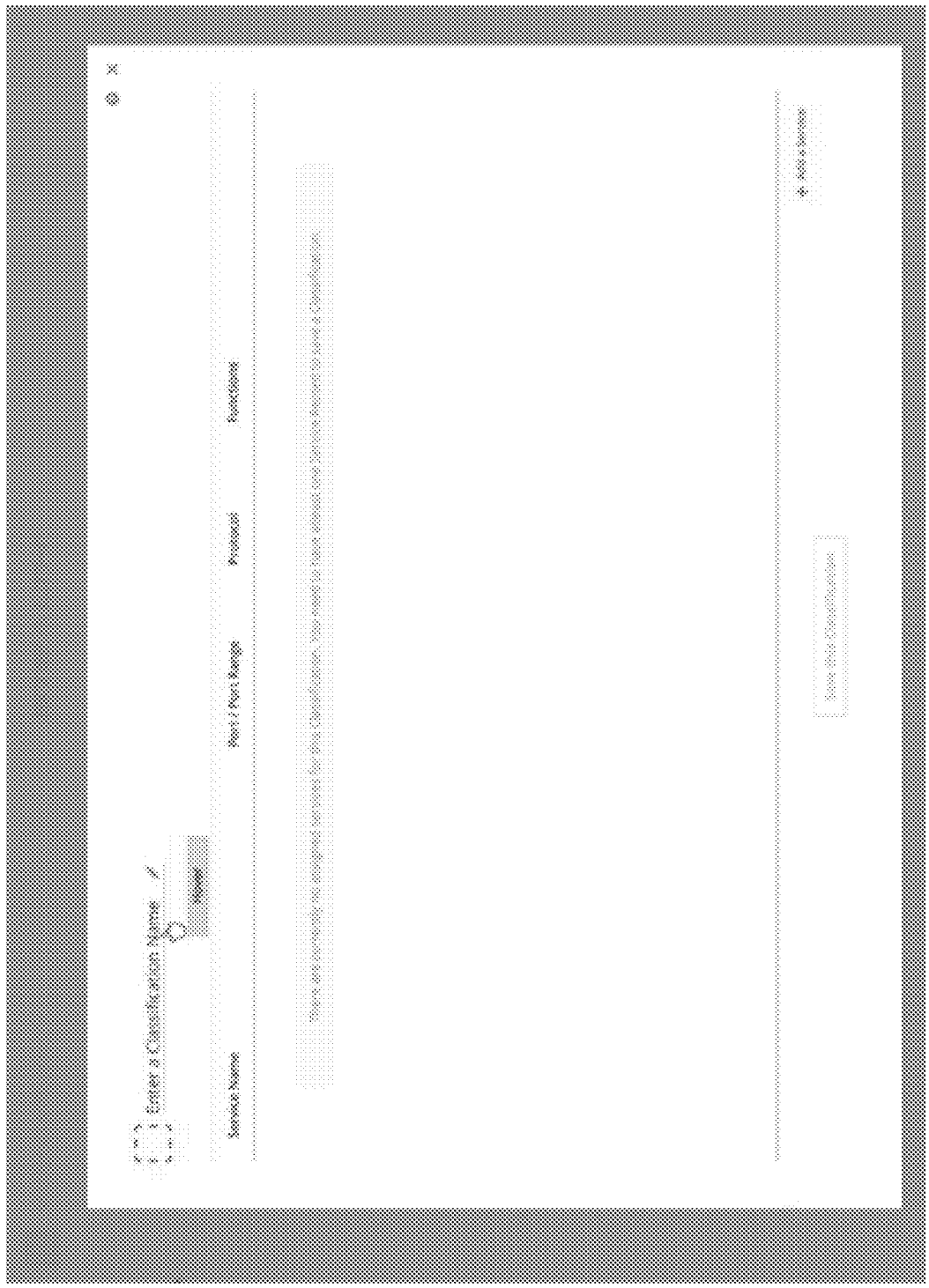
FIG. 10 is a classification definition user interface of an enterprise security management tool in which a custom classification can be defined, according to an example embodiment of the present disclosure.

FIG. 10 is a classification definition user interface 1000 of an enterprise security management tool in which a custom classification can be defined, according to an example embodiment of the present disclosure. The classification definition user interface 1000 can be presented to a user who selects the create classification button 806 of FIG. 8.

Figure 11:
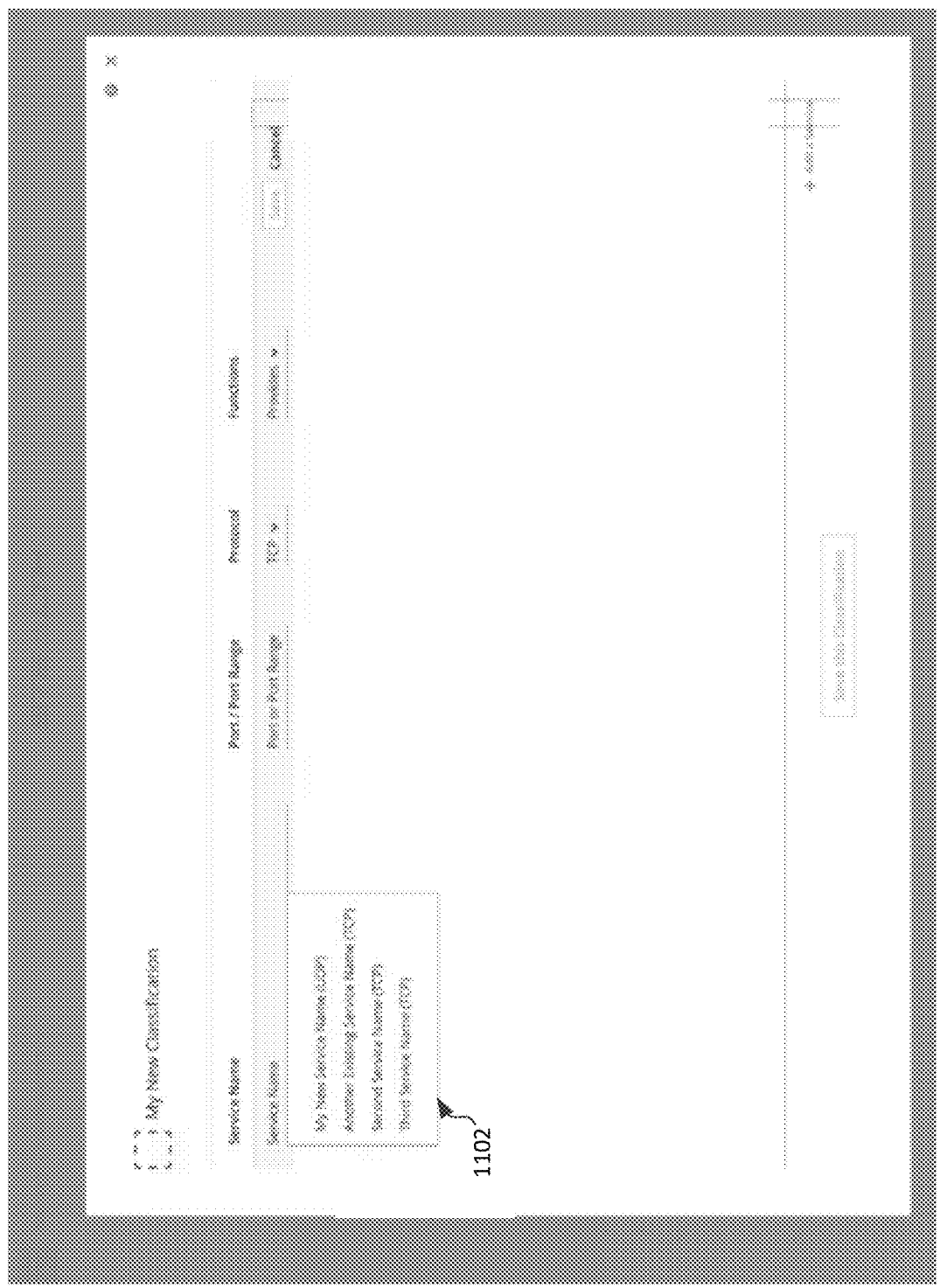
FIG. 11 illustrates the classification definition user interface of FIG. 10, allowing a user to define a custom classification.
Figure 12:
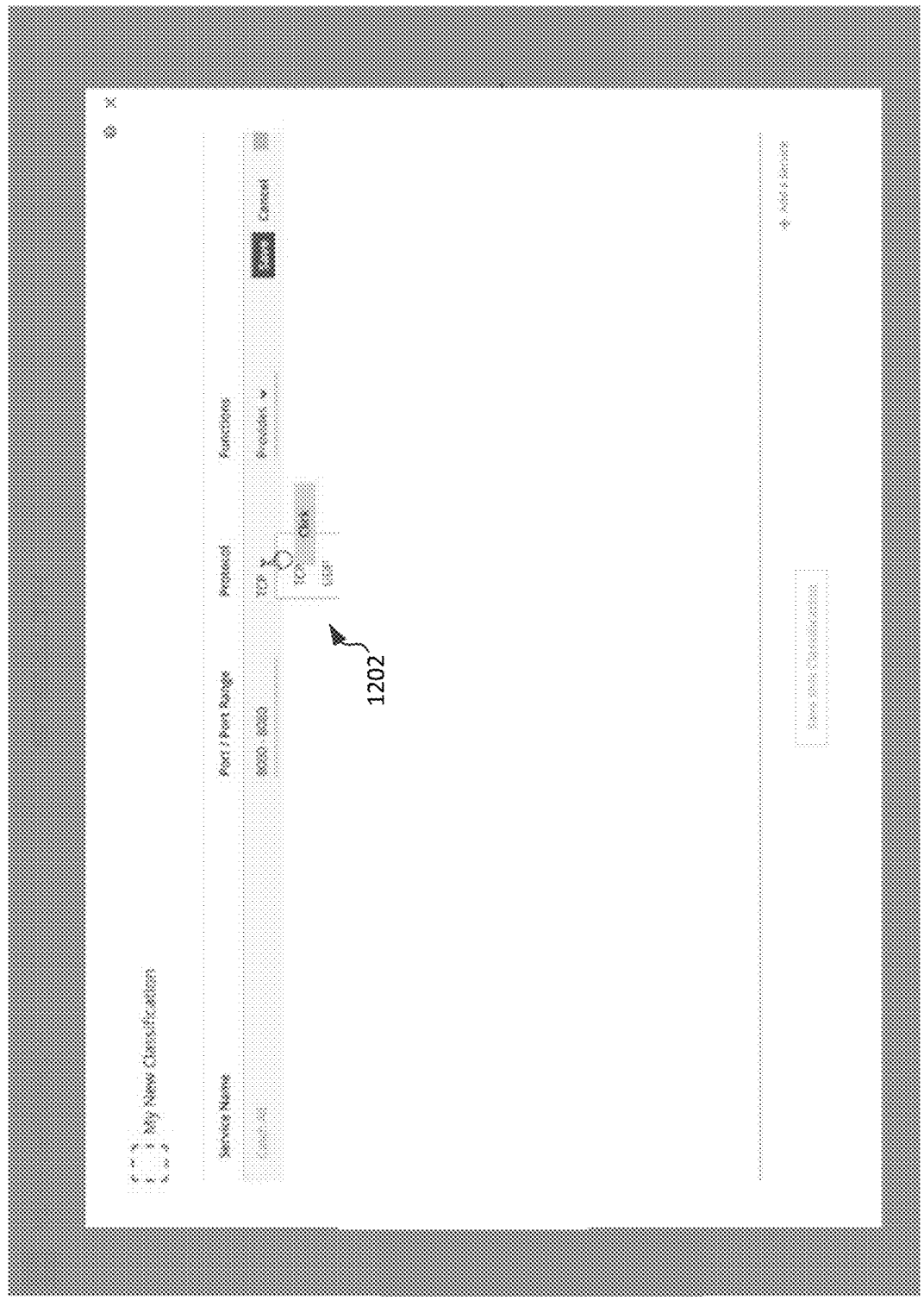
FIG. 12 illustrates the classification definition user interface of FIG. 10, allowing a user to define port and protocol attributes of a custom classification.
Figure 13:
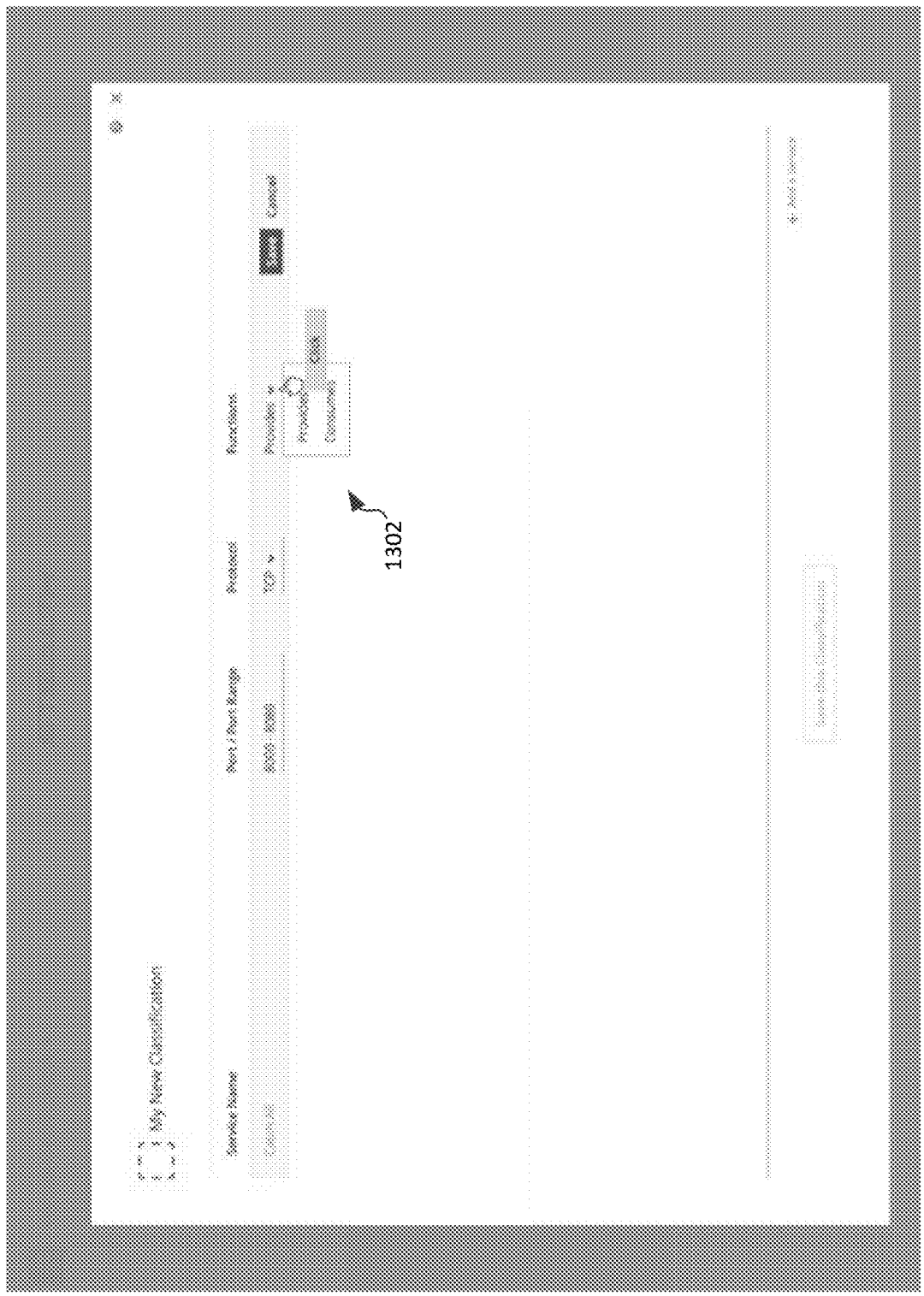
FIG. 13 illustrates the classification definition user interface of FIG. 10, allowing a user to define a function attribute of a custom classification.

FIG. 11 illustrates the classification definition user interface 1000 of FIG. 10, allowing a user to define a custom classification. In FIG. 11, the classification definition user interface 1000 illustrates a drop down menu 1102 listing existing services that could be selected for editing. In FIG. 12, the classification definition user interface 1000 illustrates selection of a specific protocol (at drop down 1202) that is provided or consumed on a defined port range. FIG. 13 illustrates the classification definition user interface 1000 of FIG. 10, allowing a user to define, at drop-down 1302, whether the specific protocol at the defined port or port range is provided by or consumed by nodes and profiles that fall within the classification.

Related to FIGS. 10-13, it is noted that if a classification is a predefined classification, the classification definition user interface 1000 may still be presented; however, the settings within that classification definition may not be editable, but instead may be read-only.

Figure 14:
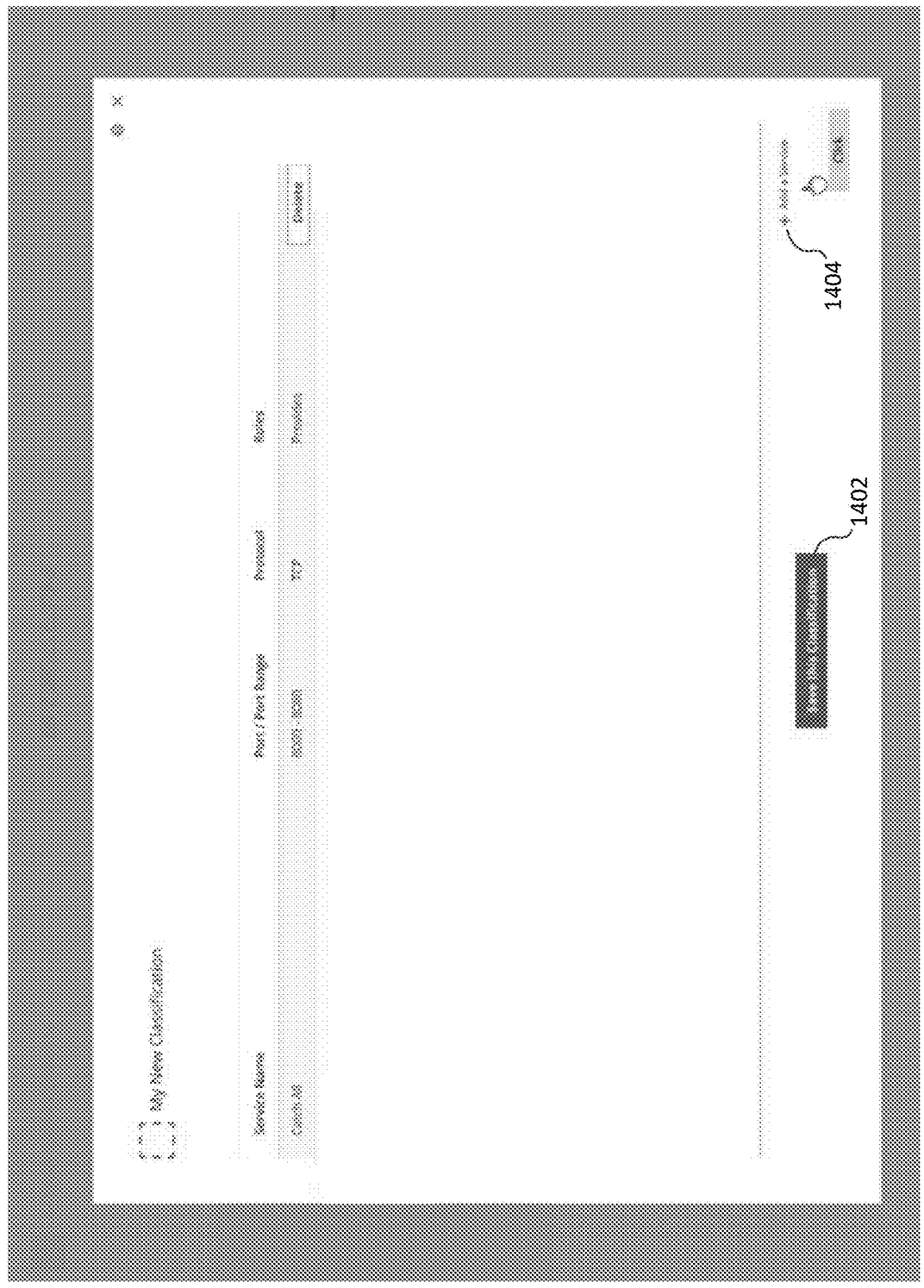
FIG. 14 illustrates the classification definition user interface of FIG. 10 after a custom classification is created, according to an example implementation.
Figure 15:
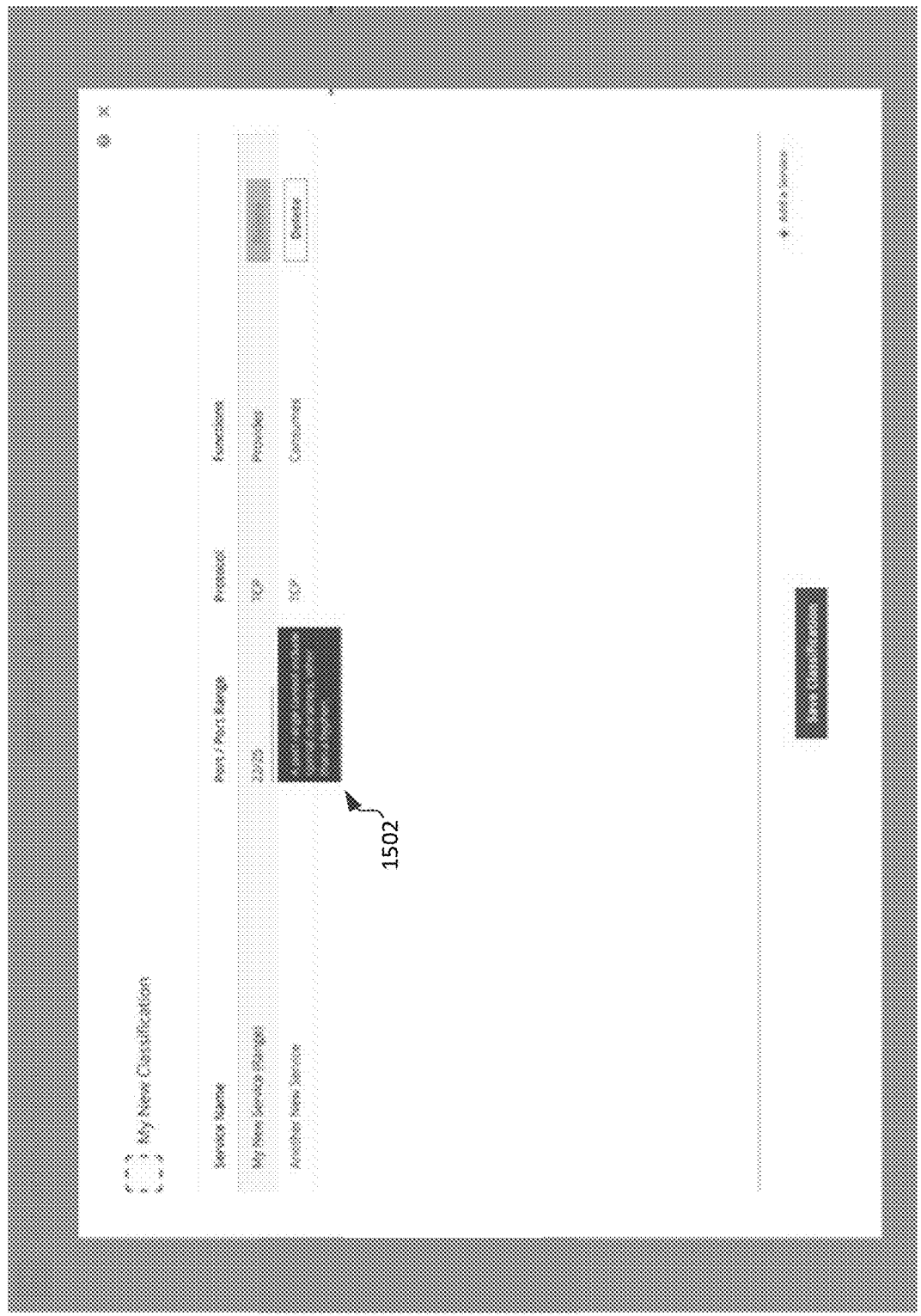
FIG. 15 illustrates the classification definition user interface of FIG. 10 in an example in which a custom classification violates a definition parameter rule, according to an example implementation.

FIG. 14 illustrates the classification definition user interface 1000, in which a classification is fully defined; at that point, a save classification option 1402 can be selected to add the classification to the classification listing 802 of FIG. 8. Additionally, if other services are required to be added to define the classification, an add service option 1404 can be selected. If such an add service option 1404 is selected, as seen in FIG. 15, a further service can be displayed, and is similarly defined by port/range, protocol, and providing/consuming function. In various embodiments, and as illustrated in FIG. 15, the classification definition user interface 1000 includes an automatic checking options to ensure that definitions allowing user entry only receive input in an acceptable format; if an unacceptable format is entered, a warning message (such as warning message 1502) can be displayed.

Referring back to FIG. 8, when a rooting order screen is selected using toggle option 810, the rooting order user interface 1600 of FIG. 16 is shown. As illustrated, one or more of the classifications displayed in the configuration user interface 800 can be listed in an order in which those nodes are to be considered root nodes within "solutions", or organized groupings of interconnected profiles that may have interrelated policy settings. In the example shown, a rooting order listing 1602 allows a user to drag and drop classifications to reorder as desired, such that, once a rooting order is set and affinitization is performed (as discussed in further detail below), one or more solutions may be manually or automatically formed starting from root nodes, according to algorithms described herein and in the above-noted applications that were incorporated by reference. Optionally, each classification within the listing 1602 has a remove option 1604 to allow removal of that classification as including a possible root profile. An add classification option 1606 allows a user to select to add a classification to the listing 1602.

Upon selection of the add classification option, as illustrated in FIG. 17, an additional listing line is displayed, allowing a user to type a name of a classification to be added. As seen, autofill options in a drop down menu 1702 can be presented to the user from among the listing of classifications that are defined in listing 802. Upon selection of one of those listed classifications, that classification can be added to listing 1602, and prioritized by drag and drop movement within the listing.

Figure 18:
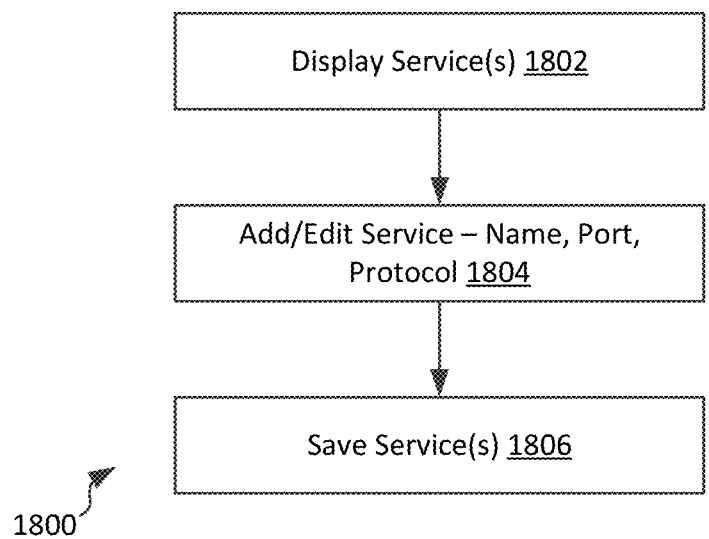
FIG. 18 is a flowchart of a method for defining services in a service manager of an enterprise security management tool.
Figure 19:
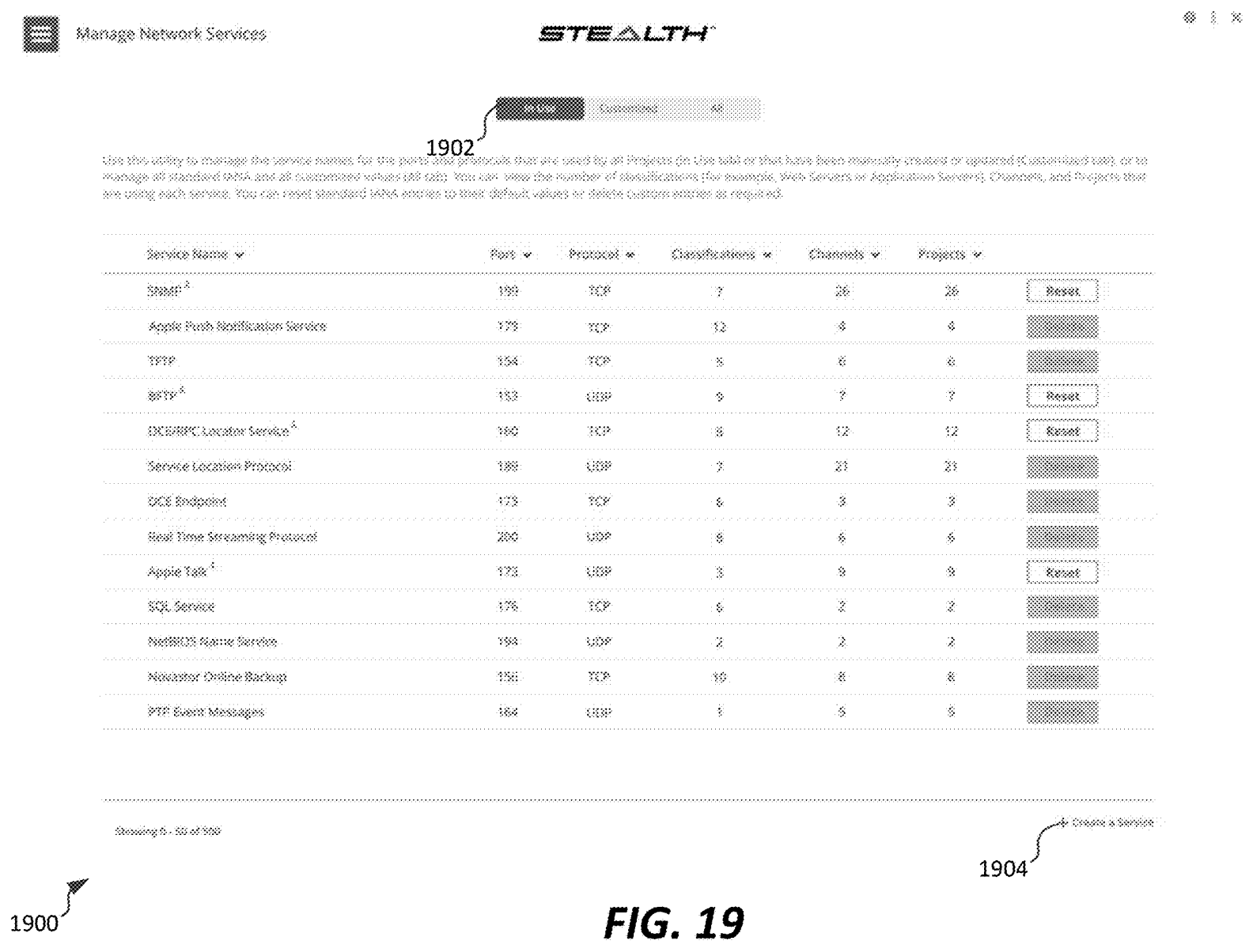
Figure 20:
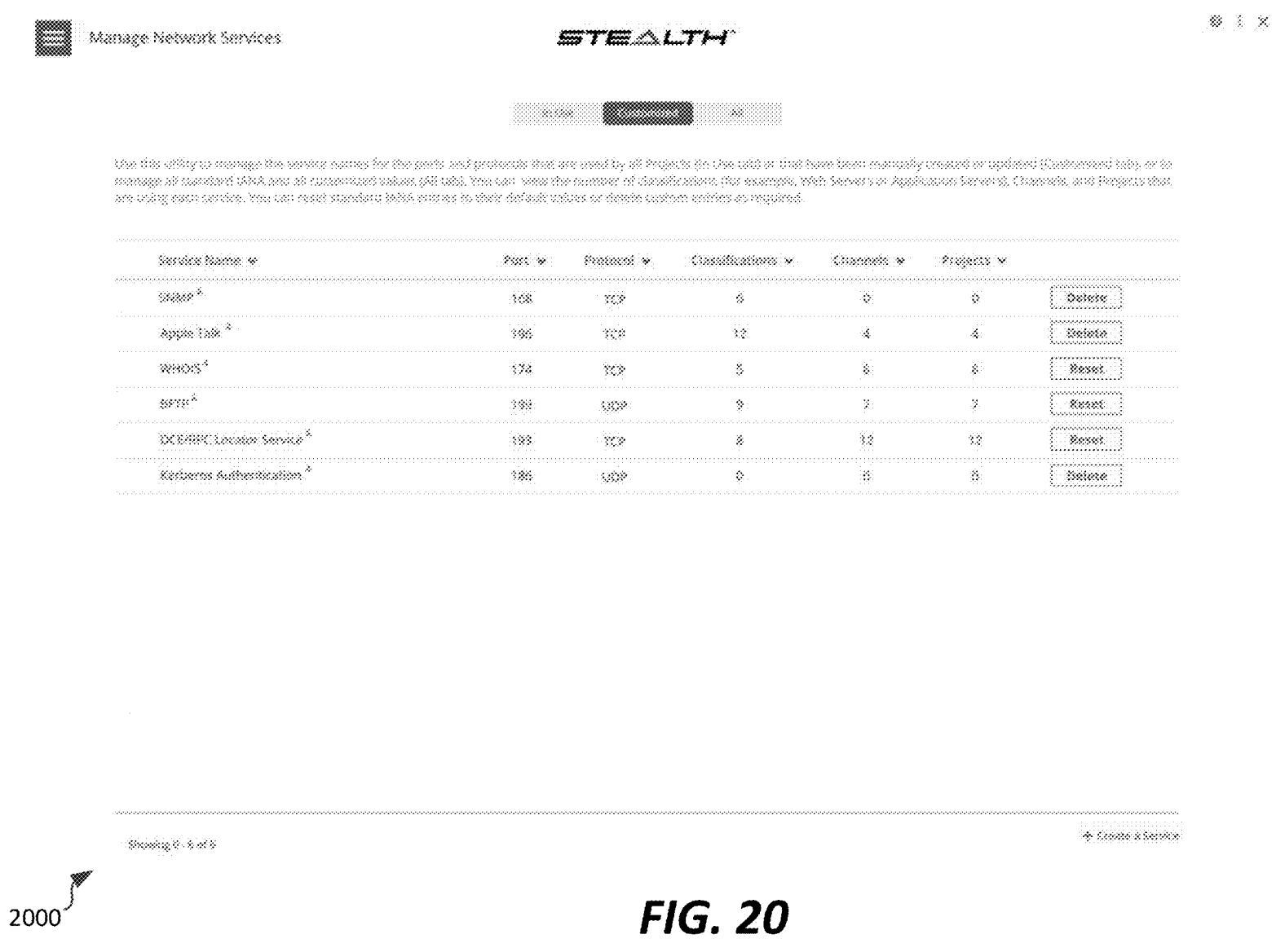

FIGS. 18-20 illustrate methods and user interfaces provided by a service manager, such as service manager 427 of FIG. 4, above. In general, the service manager operates similarly to the classification manager 425, but rather than allowing a user to define classifications, particular services are definable for purposes of using those services to further define either channels (interconnections among nodes/profiles) or to define the specific port/protocol combinations used in the service-based definitions of the classifications themselves.

Referring to FIG. 18, a method 1800 of customizing services using a service manager 427 is disclosed. The method 1800 includes displaying a list of available defined services (step 1802), which can, in some embodiments, include predefined services as well as user-defined services. The method can also include adding or editing a service (step 1804), which involves naming a specific port and protocol such that the unique name for that port and protocol can be (1) easily recognized by a user, as well as both (2) quickly recalled when either viewing a graph of an enterprise network including a complex web of channels, and (3) easily recalled when defining specific custom classifications. The method includes saving the added/edited services (step 1806) which can record the service (name, port, protocol) in a configuration database for later use by various projects within the tool.

Referring now to FIG. 19, a service definition user interface 1900 is shown. The service definition user interface 1900 can be generated and/or provided by a service manager, such as service manager 427 of FIG. 4, within the enterprise security management tool 412. Using the service definition user interface, a user can create one or more customized heuristics, or rules that examine network traffic data to classify nodes into categories. Accordingly, classifications can simply be viewed as containers for heuristics; this logical arrangement is discussed a bit further below in connection with FIG. 27.

In the example shown, the user interface 1900 includes a plurality of views defined by a toggle 1902 among an in use listing, a customized listing, and a complete listing of services. FIG. 19 illustrates the in use listing, reflecting any service that has been defined and is in use within at least one project. A create service option 1904 forms a new line in the list of services, and allows a user to enter port and protocol information into that line, as well as a custom name for that service. Similarly, FIG. 20 is a further service definition user interface 2000, illustrating only the customized services. As can be seen in FIGS. 19-20, any predefined services may be reset but not deleted, and in particular any in-use services cannot be deleted while in use (as in FIG. 19). However, customized services that are not in use may be deleted (as in FIG. 20). A further interface (not shown) reflecting aggregation of the services in FIGS. 19-20 is available as well, via the toggle 1902. Once services are defined using the service manager, such services can be stored, for example within the enterprise management configuration server 130 of FIG. 1, or even within configuration database 122 or enterprise management server 120.

III. Defining Projects and Solutions Using Customized Classifications and Services Once classifications and services are defined, the classifications and services can be used to assist in forming nodes into profiles (based on the definition of the classifications) and arranging profiles into solutions (e.g., based on the defined rooting order of the classifications) In particular, FIGS. 21-24 illustrate methods for logically grouping nodes by affinity using classifications, including the custom classifications described herein, and configurable using the classification manager described above.

Figure 21:
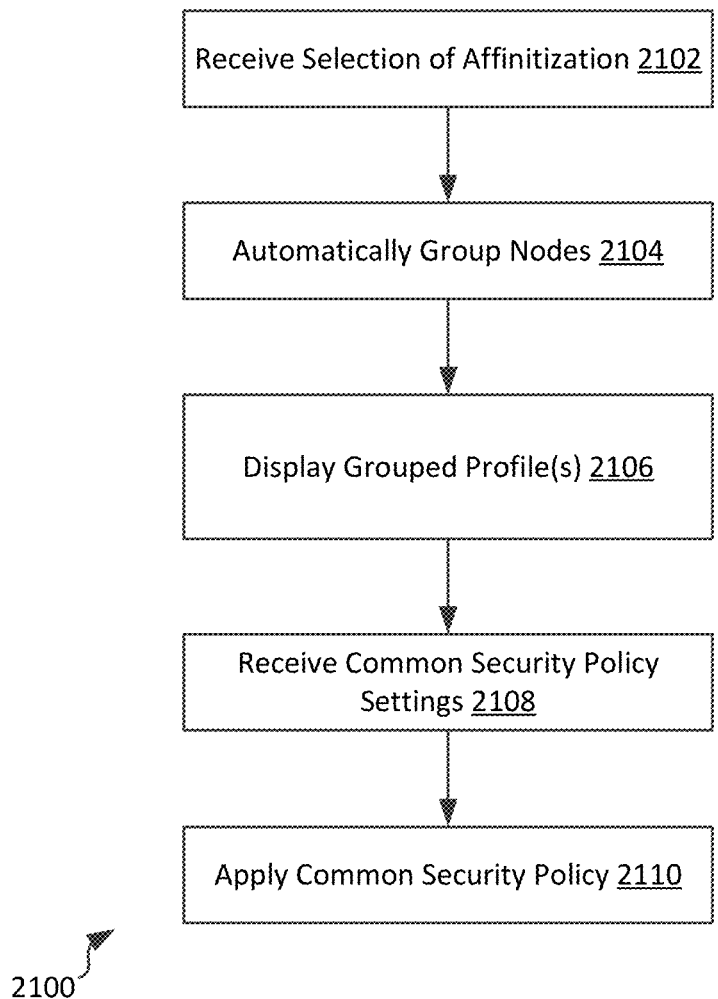
FIG. 21 is a flowchart of a method for logically grouping nodes according to affinity and based on predefined classifications, according to an example embodiment of the present disclosure.

Referring specifically to FIG. 21, a method 2100 for logically grouping nodes according to affinity into profiles is illustrated, according to an example embodiment of the present disclosure. The method 2100 generally illustrates how a profile can be automatically created based, at least in part, on the concordance data imported into a project within the enterprise security management configuration tool, using the classifications that are either predefined in the tool or which are customized by a user.

Figure 22:
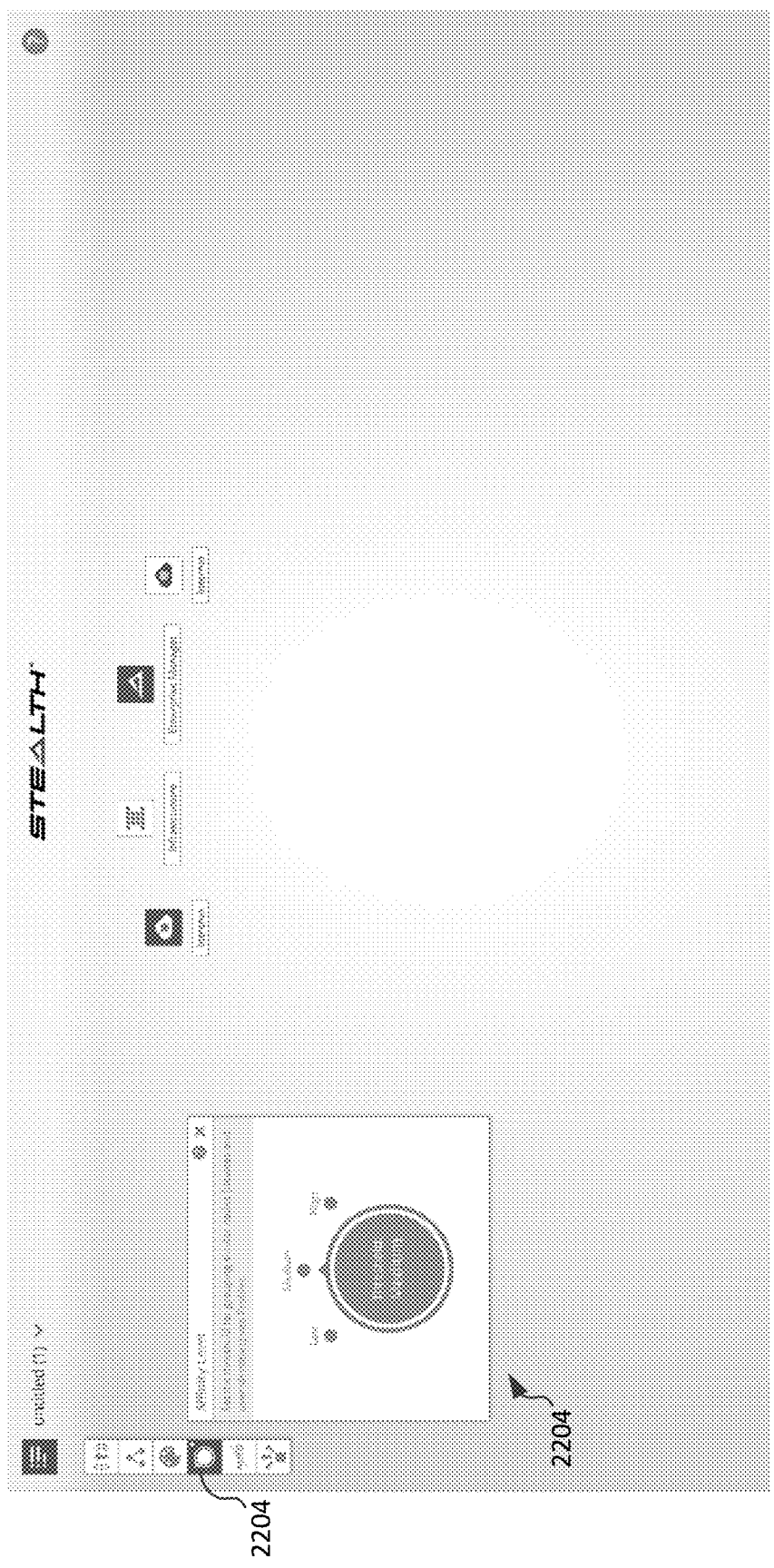
FIG. 22 is a configuration user interface of an enterprise security management tool in which an affinitization tool is depicted, according to an example embodiment.
Figure 23:
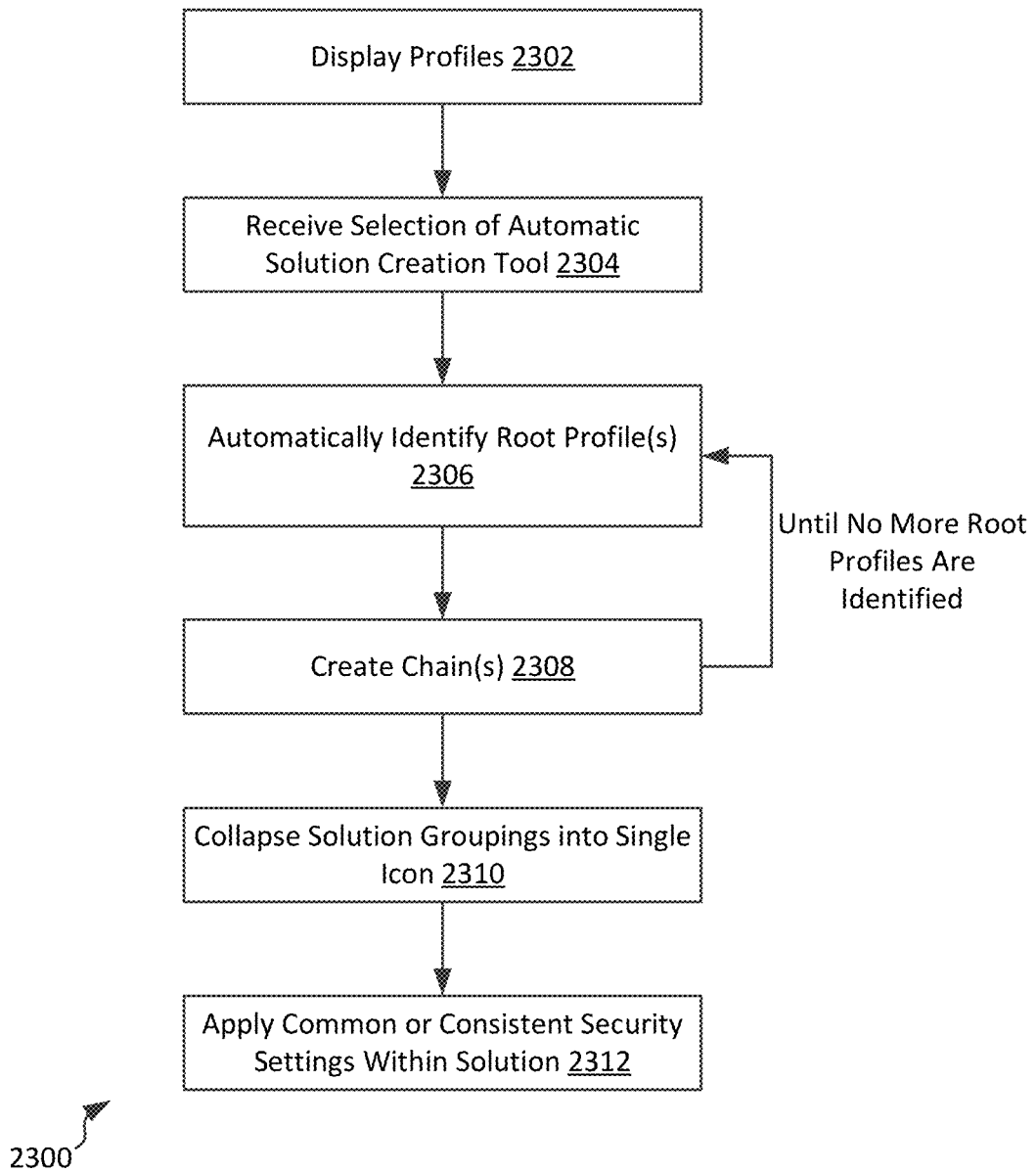
FIG. 23 is a flowchart of a method for automatically identifying a root profile of a solution, according to an example embodiment of the present disclosure.

In the embodiment shown, the method 2100 includes receiving a selection of an affinitization level at which nodes will be grouped into a profile (step 2102). The affinitization level can be manually defined, or can be selected from among a plurality of preset levels. In one example embodiment, the affinitization level can be set using an affinitization knob presented in the configuration user interface in response to selection of an affinitization tool from the tool palette. Such an affinitization knob can have a plurality of settings, such as low, medium, and high settings. In such an example, a low setting may be set at a low predetermined threshold, such as a normalized affinitization of 0.6 (e.g., 60% similar based on a set of node characteristics) for low affinitization, 0.8 for medium affinitization, or 1.0 for high affinitization, indicating that the nodes must be identical to be grouped into a profile. Affinitization can take into account a variety of factors, including, for example, a logical or physical location of the node, communications between the node and other nodes within the enterprise network or external to the enterprise network, domain names or other identifiers of the node, or other types of attributes from which similarity can be derived. One example of an affinitization tool is depicted in FIG. 22, discussed below.

In the embodiment shown, the method 2100 further includes automatically grouping nodes into profiles in response to selection of a predetermined affinity (step 2104). The grouping of nodes into profiles can, in such cases, simplify a depiction of an enterprise network topology, at least because multiple similarly-situated nodes are grouped under a single profile icon (step 2106), and as such, a plurality of grouped nodes can be displayed as a plurality of profiles. The plurality of profiles are each defined according to a particular classification, as illustrated below. Additionally, because the single icon for a profile can represent a plurality of nodes, the single icon can have a number of security settings be applied commonly to each of the nodes, as noted below.

In example embodiments, common security policy settings can be received in the configuration user interface (step 2108) and applied as a common security policy to each of the nodes within the profile (step 2110). This can be done when a particular solution, or project, is exported to a configuration database 122 via management server 120.

As noted above, FIG. 22 illustrates a configuration user interface 2200 including an affinitization tool 2202 from the tool palette selected. In the configuration user interface 2200, an affinity level selector region 2204 subsequently appears, and allows a user to "twist" the depicted knob, by way of a click and drag operation (or equivalent drag operation on a touch screen display), to one of the displayed selectable affinitization levels. As illustrated, the affinitization tool includes a knob movable between low, medium, and high affinitization levels.

In conjunction with affinitization, it is noted that because ultimate affinitization is based at least in part on services being provided/consumed by nodes and profiles, the customization of specific port and protocol pairs via the classification manager 425 and service manager 427 can affect grouping of nodes and profiles into certain classifications, as well as definition of certain channels by service. Furthermore, and in addition to affinitization, use of root profiles to define solutions can involve use of custom classifications as described herein. Because classifications are defined before solutions are formed, the custom classifications can be used in automatically establishing a graphical topology of the enterprise for purposes of deploying security settings. Generally, such topologies can be complex. To simplify the topology, a solution can be created to logically group interconnected nodes/profiles.

In example embodiments, solutions may be manually or automatically created; for at least automatically created solutions, a manner in which solutions are formed is highly dependent on rooting order. Such rooting is illustrated in connection with FIG. 23, which provides an example method 2300 is shown for automatically forming solutions representing logical interconnections of profiles, according to an example embodiment of the present disclosure. In the example shown, the method 2300 includes display of a plurality of profiles (step 2302). A user can view those profiles, in a configuration user interface and can select a tool for creation of solutions automatically. The method 2300 can receive that selection (step 2304), and will initiate a process to automatically identify one or more root profiles within the set of profiles included in the project as displayed (step 2306). In general, identifying root profiles includes identifying a source of data that may need to be secured, and grouping profiles that would likely retrieve and/or process that data for use by an end user. One example method of identifying root profiles is discussed in further detail below in connection with FIG. 22.

In the example shown, for each root profile identified (e.g., as defined in the rooting order user interface seen in FIGS. 16-17), one or more chains of related profiles are associated with that root profile (step 2308). The chains of related profiles generally correspond to the profiles that are interconnected with the root profile as evidenced in concordance data, and reflected graphically by channels connected to the root profile in the configuration user interface (e.g., between the root profile and a profile of one or more endpoints). The identification of a root profile and subsequent creation of chains continues down through the ordered priority listing as illustrated in FIGS. 16-17, until no more root profiles can be automatically identified according to rules for identifying root profiles. At that point, (or during the solution creation process), each solution, including a root profile and one or more chained profiles, can be collapsed into a single "solution" icon (step 2310). The solution icon can be selected and expanded to show the profiles included within the solution, as well as the channels among solutions which are persisted when the profiles are included within the solution.

Once a user has created one or more solutions, that user can select and modify various security settings for each of the profiles included in the solution, for example by using a variety of graphical tools (step 2312). Details regarding manipulation of such a solution-based graphical user interface to select security settings for a specific profile and/or node are discussed further below in connection with details regarding the configuration user interface.

Figure 24:
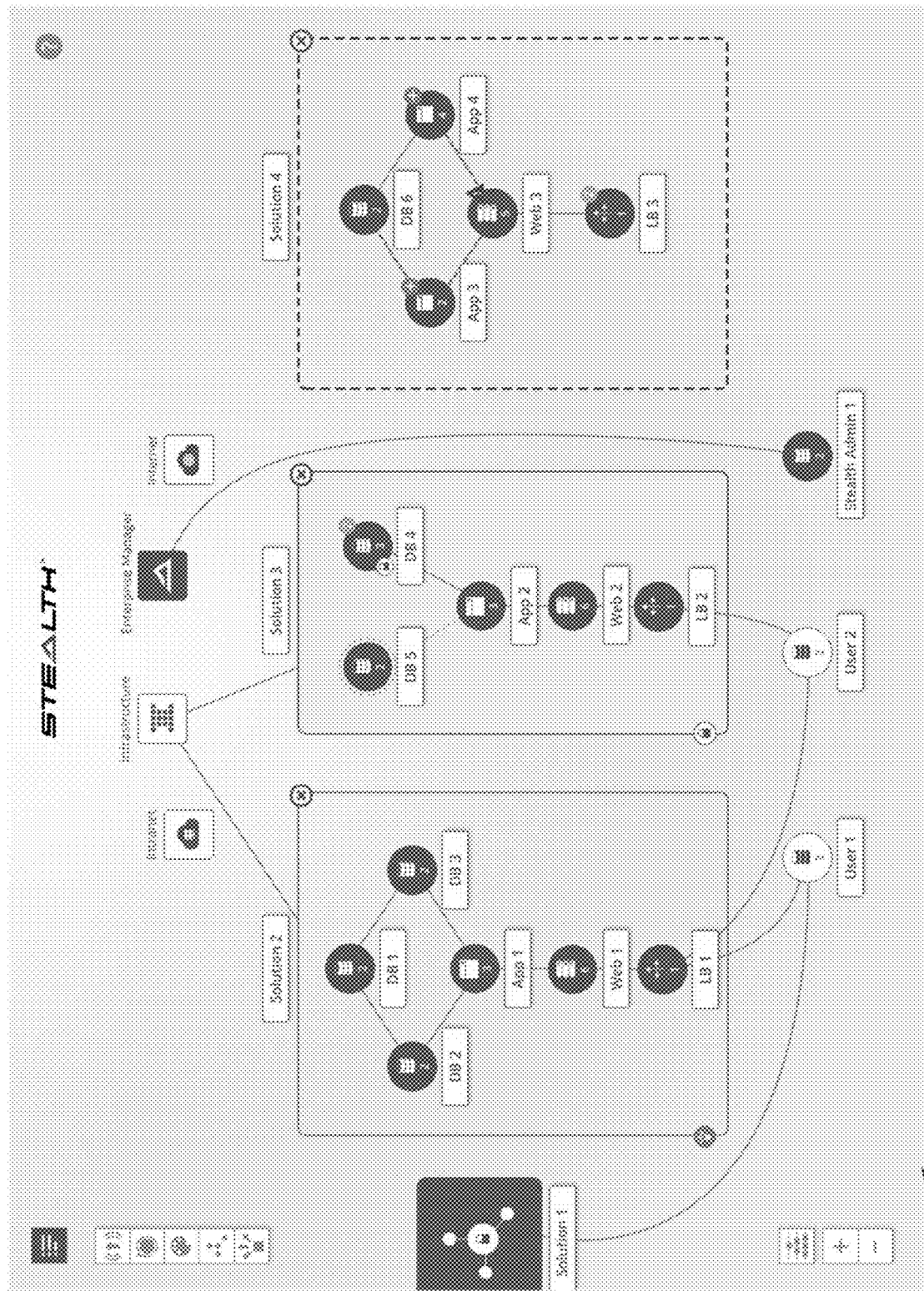
FIG. 24 is a configuration user interface of an enterprise security management configuration tool, in which alerts can be illustrated in the various solutions defined, according to an example embodiment.

Referring now to FIG. 24, a configuration user interface 2400 is shown that can be generated by an enterprise security management configuration tool. The configuration user interface 2300 generally represents a state of the tool after an automatic solution generation tool is selected. As illustrated, a plurality of solutions are depicted that can include root profiles (in this instance, with database servers prioritized as root profiles); in addition, a variety of profiles are included (represented as icons) some of which can be defined as falling within custom classifications, as noted above. Once a graphical depiction of an enterprise is arranged as intended, the selected security settings that can be defined for each node, profile, solution, or channel (as described in the related patent filings incorporated by reference above), can be propagated via export of the solution or project to the enterprise security management server for application within the enterprise.

IV. Export of Solution to Enterprise Security Management Server

Figure 25:
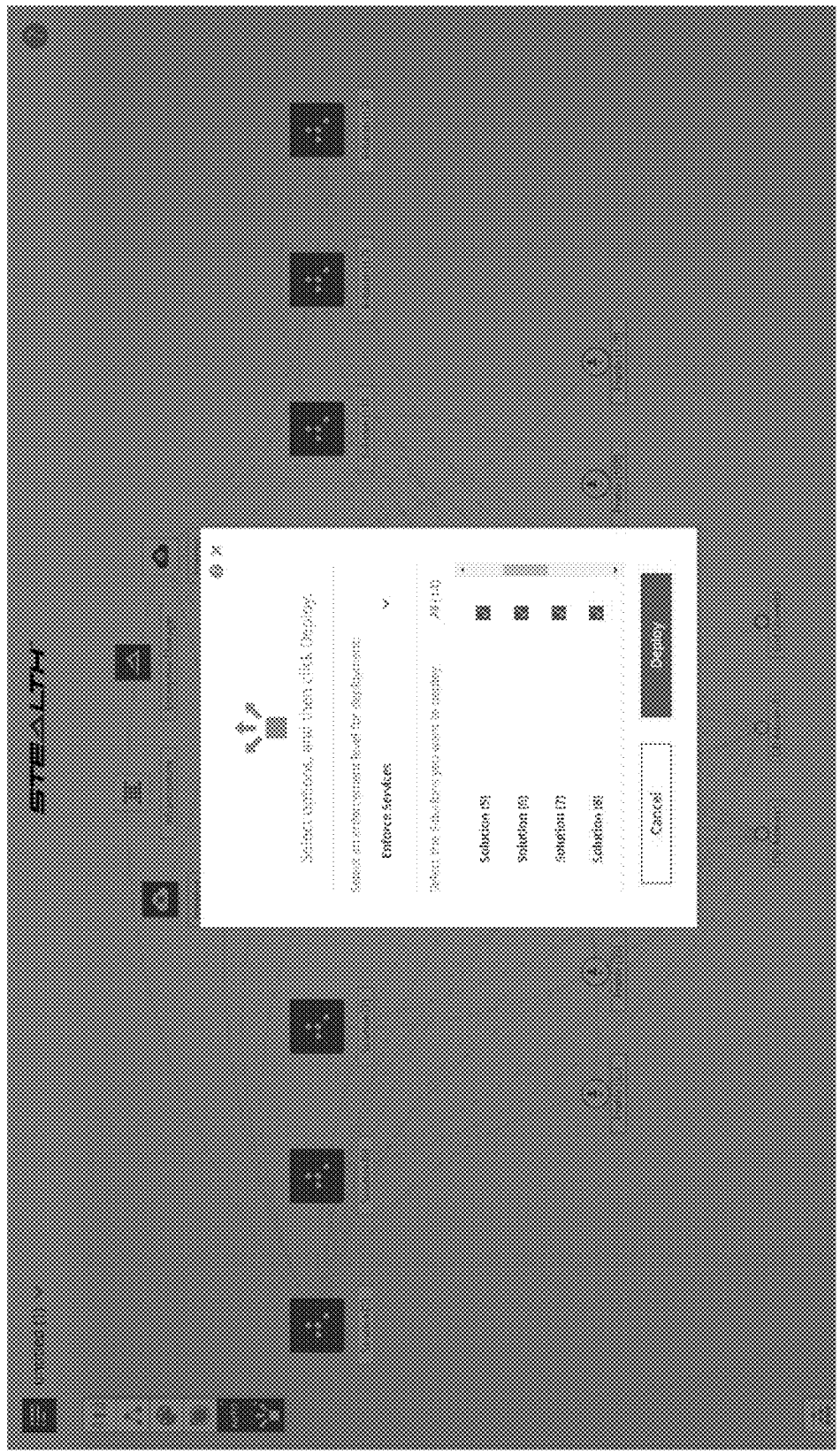
FIG. 25 is a configuration user interface of an enterprise security management tool useable to export a security settings file to an enterprise management server, according to an example embodiment.
Figure 26:
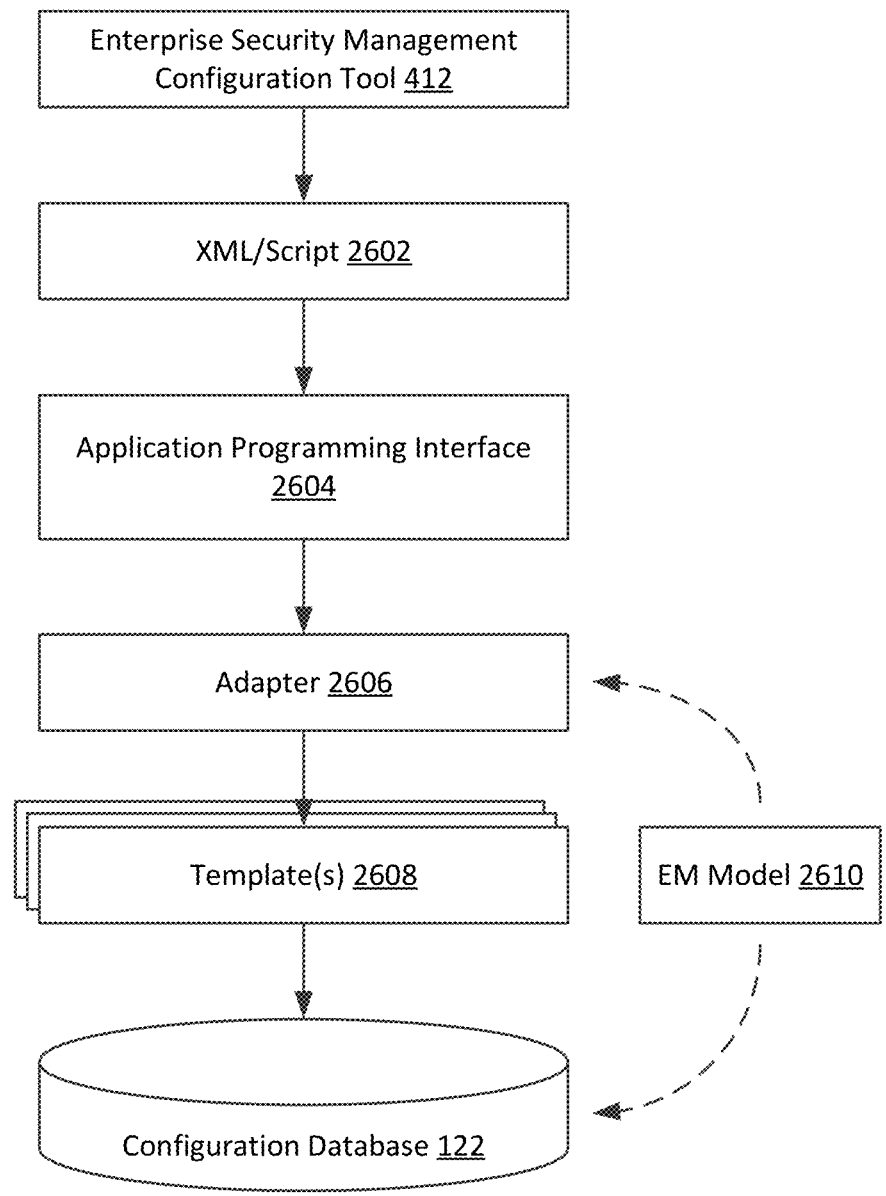
FIG. 26 illustrates a data flow from an enterprise security management tool useable for import into a configuration database managed by an enterprise management server, according to an example embodiment.
Figure 27:
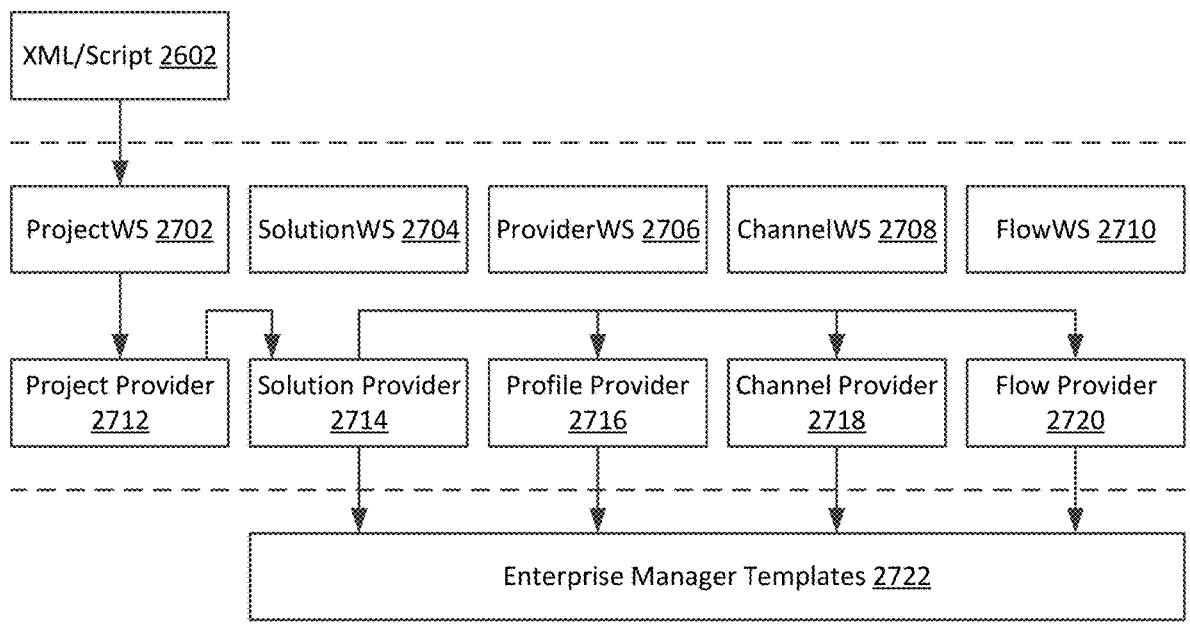
FIG. 27 illustrates details regarding data processing within an enterprise management server exposing an application programming interface configured to ingest a security policy settings file from the enterprise security management configuration tool, according to an example embodiment.

Referring now to FIGS. 25-27, details regarding deployment or export of a configuration developed in the enterprise security management tool are described. Generally, the projects and solutions as defined using such a tool, as described above, must be exported for use by an enterprise management server which can in turn deploy security settings within an enterprise network, as noted above in connection with FIG. 1. Within the enterprise security management tool itself, and as seen in FIG. 25, a user interface 2500 can be displayed for export of a security policy from the tool itself. As illustrated, the user interface allows a user to select one or all solutions included in a project, e.g., for deployment to an enterprise network.

FIG. 25 is a configuration user interface 2500 of an enterprise security management tool useable to export a security settings file to an enterprise management server, according to an example embodiment. Upon selection of a deployment tool from the tool palette, a window is shown that allows a user to (1) select whether to enforce services in the deployment, and (2) select whether to deploy all or a portion of the currently active project. As to services enforcement, a drop-down option allows the user to select among enforcement of services, enforcement of IP addresses, enforcement of both IP addresses and services, or neither. Enforcement of services results in generation of filters to enforce local ports as to specific, specified services. Enforcement of IP addresses generates filters to enforce usage of local ports on a particular node as tied to services and addresses of particular profiles. Additionally, every defined solution is depicted in the configuration user interface 2500, allowing a user to select all or a portion of the project for deployment.

Upon selection of a deployment option, the enterprise security management tool will generate an output security settings file, in the form of an XML-based file that can be ingested by an enterprise management server, such as server 120 of FIG. 1, for storage of filters and settings in a configuration database 122, and for distribution to nodes within the enterprise network (by the enterprise management server).

Referring to FIG. 26, a specific data flow 2600 is illustrated, showing export of such an XML-based file from the enterprise security management tool to a configuration database of an enterprise management server. In the example shown, enterprise security management tool 412 outputs an XML-based file 2602 that is compliant with an application programming interface (API) 2604 that is published by the enterprise management server. The API 2604 defines separate resources for each of a project, a solution, a profile, a channel, a flow, and includes request status messages as well. Details regarding processing of each of these API components are described in further detail below in connection with FIG. 27. However, once ingested and parsed, the XML file, which designates security settings in terms of such profiles, solutions, and nodes, can be converted to an arrangement useable by the enterprise management server, which does not necessarily use the same logical arrangement of devices. Rather, in an enterprise management server, specific domains, endpoints, communities of interest, or other sub-divisions of an enterprise network may be managed. Accordingly, an adapter 2606 converts the security policy settings such that they are mapped to appropriate network resources, according to the layout of the enterprise network (which is maintained and managed in the enterprise management model 2610, described in detail in U.S. patent application Ser. No. 14/688,348, entitled 'Enterprise Management for Secure Network Communications over IPSec", the disclosure of which was previously incorporated by reference).

In the embodiment shown, one or more templates 2608 receive objects extracted from the XML-based file 2602 from the adapter, to process the security settings received in that file. The templates 2608 can feed data that is mapped to the configuration database objects directly into the configuration database 122 for distribution within the enterprise network.

FIG. 27 illustrates further details regarding data processing within an enterprise management server exposing an application programming interface 2604 configured to ingest a security policy settings file from the enterprise security management configuration tool, according to an example embodiment. In the example implementation shown in FIG. 27, the XML-based file 2602 is received at the API 2604, and the file is routed to a project resource. The project resource is a container of multiple solutions, including a project 3702, a solution 2704, a provider 2706, a channel 2708, and a flow 2710, and provides a mechanism to pass the collection of solutions (shown as solutions 2704-2710) as a single XML. The solutions, and their channels and flows, are extracted from the XML and passed to their respective providers (2712-2720, respectively) for further processing. In the hierarchy of the XML file, the project contains solutions, and the solution contains descriptions of the profiles, channels and flows. For example, a digestible XML file could take the format:

```
<?xml version="1.0" encoding="UTF-8" standalone="true"?>
 <project>
     <solution>
         <id>SolutionID</id>
         <name>test-Profile </name>
         <description>Description</description>
         <profiles>
             <profile>
             <id>ProfileID</id>
             <name>test-Profile </name>
             <description>ProfileDescription</description>
             <enabled>true</enabled>
             <stealthPolicy>1</stealthPolicy>
             <clearTextPolicy>unknown</clearTextPolicy>
             <enforcement>1</enforcement>
             <groupName>GroupID</groupName>
             <ipAddresses>
                   <ipAddress>80.63.99.139</ipAddress>
             </ipAddresses>
         </profile>
         ...
         <channels>
             <channel>
             <id>ChannelID</id>
             <name>test-Channel </name>
             <description>Description</description>
             <policy>0</policy>
             <coiName>test-COI</coiName>
             <primaryProfileId>ProfileID</primaryProfileId>
             <secondaryProfileId>SecondaryID</secondaryProfileId>
             </channel>
             ...
         <flows>
             <flow>
             <id>FlowID</id>
             <name>test-Flow </name>
             <description>Description</description>
             <enabled>true</enabled>
             <policy>allowClearText</policy>
             <provisioningFlow>false</provisioningFlow>
             <accessPoint>
```

```
            <port>24803</port>
            <protocol>UDP</protocol>
        </accessPoint>
        <consumerProfileId>ConsumerID</
        consumerProfileId>
        <providerProfileId>ProviderID</providerProfileId>
        </flow>
        ...
    </flows>
    ...
</solution>
...
</project>
```

Such a file can be parsed and separated, with the various portions routed to appropriate providers for purposes of writing to enterprise manager templates 2722, which map directly to data fields in a configuration database of the enterprise management server (e.g., configuration database 122 of management server 120).

It is noted that although the enterprise security management tool separates projects into solutions, profiles, nodes, channels, and flows, these may not have a direct relationship to corresponding objects in a configuration database. As such, the API 2704 is configured to receive data in the format known by the enterprise security management configuration tool, but convert that data to be known in the configuration database.

V. Management of Classifications and Services

Figure 28:
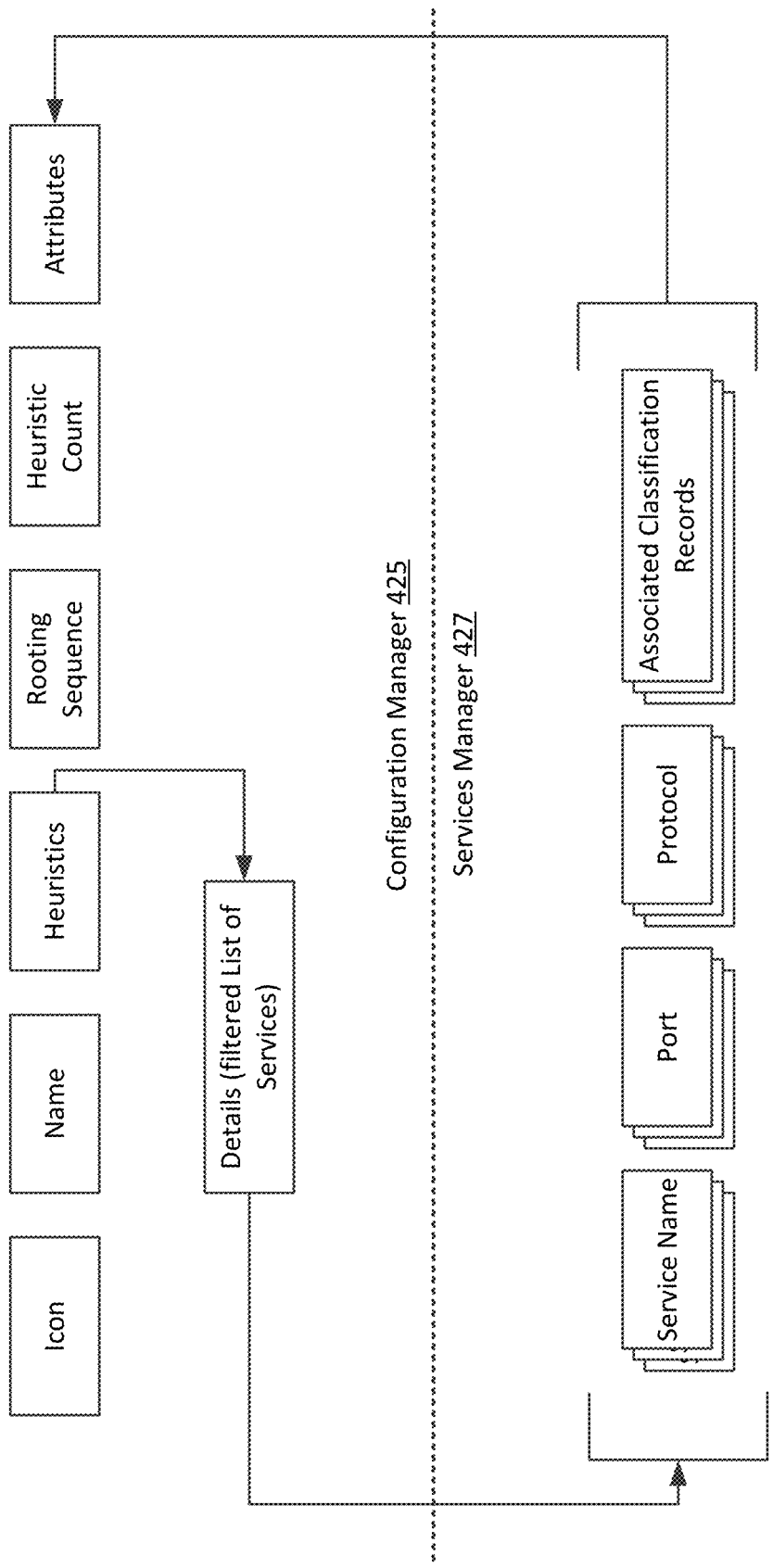
FIG. 28 illustrates a correlation between the custom classification definition and a schema of the configuration database, according to an example embodiment.

Referring to FIG. 28, a logical diagram 2800 of a correlation between data managed by the classification manager 425 and the services manager 427 is shown. In general, within the classification manager 425, an icon displayed in the user interface will have a name (e.g., a user given or default name, as well as one or more heuristics, or discoverable properties. As explained above, in the context of classifications, such discoverable properties may include a port range, a protocol, and a provider or consumer relationship to a particular service; for a service, such discoverable properties may include a name as well as a port and protocol. Still other items (e.g., nodes, profiles, solutions, and projects) may be managed in a similar way. A rooting sequence is also stored in the classification manager, as well as a heuristic count. The classification manager 425 can also track attributes associated with each classification and associated services as well. The heuristics can be used to generate a filtered list of services, which can be provided to the service manager, which stores service names, ports, and protocols in service records; classification records provided by the services manager 427 can be used to populate the attributes of a classification within the classification manager.

It is noted that, as a user may change a definition of a classification, that change is global across projects managed by the tool. Furthermore, changing a classification may change an entire way a solution or project would be visualized and/or deploy. Accordingly, one or more rules may be defined for reclassifying objects upon editing of classifications. For example, if a profile or node has been created by the user, that classification is maintained untouched. If the object has not been touched by the user via the user interface, the profile or node may be subject to recharacterization. If, however, rooting order is changed, this would change the solutions, which are then rerun unless user edited and locked. Because of possible detrimental performance effects, recharacterization of nodes and/or profiles is avoided if possible.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present invention, disclosure, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

The above specification, examples and data provide a complete description of the manufacture and use of the composition of the invention. Since many embodiments of the invention can be made without departing from the spirit and scope of the invention, the invention resides in the claims hereinafter appended.

The invention claimed is:

1. A method of configuring a security policy for an enterprise network within an enterprise security management configuration tool, the method comprising:
   receiving network concordance data at an enterprise security management configuration tool, the network concordance data including a record of communications among a plurality of nodes within the enterprise;
   receiving a definition of at least one custom classification within a user interface of the enterprise security management configuration tool, the at least one custom classification including a name of the custom classification and network activity associated with the custom classification;
   receiving, in a configuration user interface, a selection of an affinitization level selected from a plurality of discrete affinitization levels, each of the discrete affinitization levels corresponding to a different extent to which nodes within an enterprise are grouped into profiles, wherein the nodes and profiles are classified according to a plurality of different classifications including the at least one custom classification;
   grouping each of the plurality of nodes identified in the network concordance data into a plurality of profiles based on the selected affinitization level; and
   generating a security settings file to be applied within the enterprise, the security settings file including, for each profile included in the plurality of profiles, a common security policy to each of the nodes included in the profile;
   wherein the plurality of profiles includes the profile classified according to the at least one custom classification.

2. The method of claim 1, further comprising:
   defining a priority order of classifications of potential root profiles within the enterprise security management configuration tool; and
   automatically forming one or more solutions within the enterprise security management tool based at least in part on root profiles identified within the plurality of profiles.

3. The method of claim 2, further comprising adding the profile classified according to the at least one custom classification to the priority order of potential root profiles.

4. The method of claim 2, further comprising deploying the one or more solutions, via the security settings file, wherein the security settings file describes security settings for each of the one or more nodes included in the identified one or more solutions.

5. The method of claim 4, further comprising importing the security settings file into an enterprise management database defining an enterprise security topology.

6. The method of claim 2, wherein defining one or more solutions includes logically associating two or more profiles via a channel.

7. The method of claim 1, further comprising defining a custom service including a name of a service and network activity associated with the service.

8. The method of claim 7, wherein the custom service is associated with one or more nodes to be included within the profile classified according to the at least one custom classification.

9. The method of claim 1, wherein grouping each of the plurality of nodes into a plurality of profiles is performed automatically based at least in part on selection of the affinitization level.

10. The method of claim 1, wherein grouping each of the plurality of nodes generates an enterprise topology graph within the configuration user interface.

11. The method of claim 1, wherein the enterprise topology graph includes the profile defined by the at least one custom classification.

12. A computing system comprising:
a programmable circuit;
a memory communicatively connected to the programmable circuit, the memory storing computer-executable instructions implementing an enterprise security management tool which, when executed, causes the computing system to:
receive network concordance data including a record of communications among a plurality of nodes within the enterprise;
receive a definition of at least one custom classification within a user interface of the enterprise security management configuration tool, the at least one custom classification including a name of the custom classification and network activity associated with the custom classification;
receive, in a configuration user interface, a selection of an affinitization level selected from a plurality of discrete affinitization levels, each of the discrete affinitization levels corresponding to a different extent to which nodes within an enterprise are grouped into profiles, wherein the nodes and profiles are classified according to a plurality of different classifications including the at least one custom classification;
group each of the plurality of nodes identified in the network concordance data into a plurality of profiles based on the selected affinitization level; and
generate a security settings file to be applied within the enterprise, the security settings file including, for each profile included in the plurality of profiles, a common security policy to each of the nodes included in the profile;
wherein the plurality of profiles includes the profile classified according to the at least one custom classification.

13. The computing system of claim 12, further comprising a plurality of server computers communicatively interconnected within an enterprise.

14. The computing system of claim 12, wherein the at least one custom classification includes the name, one or more ports associated with the network activity, a type of network traffic associated with the network activity, and a consumer/provider flag.

15. The computing system of claim 12, wherein the custom classification is reusable across a plurality of projects within the enterprise security management configuration tool.

16. The computing system of claim 12, wherein the enterprise security management tool includes at least one predefined classification.

17. The computing system of claim 16, wherein the predefined classification includes a name of the classification and network activity associated with one or more nodes to be classified according to the predefined classification, the name and the network activity being unmodifiable by a user.

18. The computing system of claim 12, wherein the enterprise security management tool is further configured to:
define a priority order of potential root profiles within the enterprise security management configuration tool; and
automatically form one or more solutions within a user interface of the enterprise security management tool based at least in part on root profiles identified within the plurality of profiles.

19. The computing system of claim 18, wherein the enterprise security management tool is further configured to:
in response to at least one of (a) editing the priority order of potential root profiles, (b) editing heuristics of the custom classification, or (c) adding or removing a custom classification:
automatically re-form the one or more solutions within the user interface of the enterprise security management configuration tool.

20. The computing system of claim 18, wherein the enterprise security management tool is further configured to:
in response to changing the priority order of potential root profiles, automatically re-form the one or more solutions within the user interface of the enterprise security management configuration tool.

21. The computing system of claim 12, wherein the enterprise security management tool, when executed, causes the computing system to:
display a configuration user interface including a logical network topology for an enterprise network based on the network concordance data received by the enterprise security management tool, wherein display of the plurality of profiles including the profile classified according to the at least one custom classification reduces a number of nodes displayed in the enterprise security configuration user interface.

22. The enterprise security management server of claim 21, wherein the enterprise security management tool is further configured to, when executed, cause the computing system to:
receive, at the classification manager user interface, a root ordering of the classifications, including the custom classification; and
display, in the configuration user interface, at least one solution including a plurality of profiles, the at least one solution defined based on the root ordering.

23. The enterprise security management server of claim 21, wherein the enterprise security management tool is further configured to, when executed, cause the computing system to:
  receive, at a service manager user interface, a definition of a service including a name of the service and network activity associated with the service;
  wherein the service is selectable within the classification manager user interface to define network activity associated with the custom classification.

* * * * *